US006216205B1

(12) United States Patent
Chin et al.

(10) Patent No.: US 6,216,205 B1
(45) Date of Patent: Apr. 10, 2001

(54) METHODS OF CONTROLLING MEMORY BUFFERS HAVING TRI-PORT CACHE ARRAYS THEREIN

(75) Inventors: Bruce Lorenz Chin, Duluth, GA (US); Robert J. Proebsting, Los Altos Hills, CA (US)

(73) Assignee: Integrated Device Technology, Inc., Santa Clara, CA (US)

( * ) Notice: Subject to any disclaimer, the term of this patent is extended or adjusted under 35 U.S.C. 154(b) by 0 days.

(21) Appl. No.: 09/082,893

(22) Filed: May 21, 1998

(51) Int. Cl.[7] .................................................... G06F 12/00
(52) U.S. Cl. ....................... 711/131; 711/149; 365/230.05
(58) Field of Search ..................................... 711/118, 131, 711/149; 365/230.05

(56) References Cited

U.S. PATENT DOCUMENTS

| | | | |
|---|---|---|---|
| 4,195,340 | 3/1980 | Joyce | 364/200 |
| 4,402,067 | 8/1983 | Moss et al. | 365/219 |
| 4,577,293 | 3/1986 | Matick et al. | 365/189 |
| 4,731,758 | 3/1988 | Lam et al. | 365/189 |
| 4,758,987 | 7/1988 | Sakui | 365/189 |
| 4,761,647 | 8/1988 | Hallenbeck et al. | 340/825.22 |
| 4,829,471 | 5/1989 | Banerjee et al. | 364/900 |
| 4,837,746 | 6/1989 | Banerjee et al. | 365/189.05 |
| 4,849,935 | 7/1989 | Miyazawa | 365/189.05 |
| 4,894,770 | 1/1990 | Ward et al. | 364/200 |
| 4,926,385 | 5/1990 | Fujishima et al. | 365/230.03 |
| 5,025,421 | 6/1991 | Cho | 365/230.05 |
| 5,079,693 | 1/1992 | Miller | 395/250 |
| 5,157,775 | 10/1992 | Sanger | 295/425 |
| 5,226,009 | 7/1993 | Arimoto | 365/189.04 |
| 5,226,147 | 7/1993 | Fujishima et al. | 395/425 |
| 5,249,282 | 9/1993 | Segers | 395/425 |
| 5,269,009 | 12/1993 | Herzl et al. | 395/425 |

(List continued on next page.)

OTHER PUBLICATIONS

Hennessy et al., *Network Topologies*, Chapter 9.6, Computer Organization and Design, The Hardware/Softward Interface, Chapter 9, Multiprocessors, Morgan Kaufmann Publishers, Inc., 1998, pp. 736–739.

(List continued on next page.)

*Primary Examiner*—Do Hyun Yoo
*Assistant Examiner*—Nasser Moazzami
(74) *Attorney, Agent, or Firm*—Myers Bigel Sibley & Sajovec

(57) ABSTRACT

Methods of controlling memory buffers having tri-port cache arrays therein include the steps of reading data from a current read register in the cache memory array to an external peripheral device, and writing data from an external peripheral device to a current write register in the cache memory array. Tri-port controller logic and steering circuitry are also preferably provided for performing efficient read and write arbitration operations to make next-to-read and next-to-write registers always available in the cache memory array. The use of four separate registers in the cache memory array, efficient steering circuitry and the tri-port controller logic essentially eliminates the possibility that gaps or stoppages will occur in the flow of data into and out of the buffer memory device during read and write operations. To always maintain a source of available data for reading or available space for writing, even under worst case operating conditions including burst mode operation, the step of performing write arbitration comprises determining a next-to-write register as a first free register in the cache memory array if the current read and write registers are different registers and the step of performing read arbitration comprises determining a next-to-read register as the current write register if the current write register contains next-to-read data relative to data in the current read register. The step of performing read arbitration may also comprise determining the next-to-read register as a second free register in the cache memory array if the current read and write registers are different registers and the next-to-read register is not the current write register, or as the next-to-write register if the current read and write registers are the same register.

36 Claims, 11 Drawing Sheets

U.S. PATENT DOCUMENTS

| | | | |
|---|---|---|---|
| 5,276,842 | 1/1994 | Sugita | 395/425 |
| 5,280,441 | 1/1994 | Wada et al. | 365/63 |
| 5,305,274 | 4/1994 | Proebsting | 365/222 |
| 5,325,487 | 6/1994 | Au et al. | 395/250 |
| 5,365,485 | 11/1994 | Ward et al. | 365/221 |
| 5,371,708 | 12/1994 | Kobayashi | 365/221 |
| 5,396,460 | 3/1995 | Harada et al. | 365/189.01 |
| 5,471,583 | 11/1995 | Au et al. | 395/250 |
| 5,479,527 | 12/1995 | Chen | 382/232 |
| 5,487,049 | 1/1996 | Hang | 365/221 |
| 5,499,344 | 3/1996 | Elnashar et al. | 395/250 |
| 5,513,318 | 4/1996 | van de Goor et al. | 395/185.01 |
| 5,519,344 | 5/1996 | Proebsting | 327/108 |
| 5,524,265 | 6/1996 | Balmer et al. | 395/800 |
| 5,541,883 | 7/1996 | Devanney | 365/201 |
| 5,544,104 | 8/1996 | Chauvel | 365/189.01 |
| 5,546,338 | 8/1996 | Proebsting | 365/181 |
| 5,546,347 | 8/1996 | Ko et al. | 365/221 |
| 5,546,569 | 8/1996 | Proebsting et al. | 395/550 |
| 5,561,781 | 10/1996 | Braceras et al. | 395/458 |
| 5,568,443 | 10/1996 | Dixon et al. | 365/230.05 |
| 5,568,495 | 10/1996 | Laczko, Sr. et al. | 371/471 |
| 5,572,471 | 11/1996 | Proebsting | 365/200 |
| 5,576,560 | 11/1996 | Runaldue et al. | 257/208 |
| 5,585,747 | 12/1996 | Proebsting | 327/55 |
| 5,586,299 | 12/1996 | Wakerly | 395/476 |
| 5,596,540 | 1/1997 | Diem et al. | 365/221 |
| 5,602,780 | 2/1997 | Diem et al. | 365/189.01 |
| 5,603,009 | 2/1997 | Konishi et al. | 395/492 |
| 5,608,685 | 3/1997 | Johnson et al. | 365/230.06 |
| 5,642,318 | 6/1997 | Knaack et al. | 365/201 |
| 5,649,232 | 7/1997 | Bourekas et al. | 395/880 |
| 5,663,910 | 9/1997 | Ko et al. | 365/189.05 |
| 5,671,393 | 9/1997 | Yamaki et al. | 395/477 |
| 5,682,356 | 10/1997 | Knaack | 365/236 |
| 5,712,820 | 1/1998 | Knaack | 365/189.02 |
| 5,715,197 | 2/1998 | Nance et al. | 365/189.02 |
| 5,732,041 | 3/1998 | Joffe | 365/230.05 |
| 5,751,638 | 5/1998 | Mick et al. | 365/189.04 |
| 5,764,967 | 6/1998 | Knaack | 395/555 |
| 5,777,944 | 7/1998 | Knaack et al. | 365/230.06 |
| 5,784,382 | 7/1998 | Byers et al. | 371/22.3 |
| 5,829,015 | 10/1998 | Maeno | 711/104 |
| 5,852,608 | 12/1998 | Csoppenszky et al. | 370/465 |

OTHER PUBLICATIONS

Katz, Case Study 4.7 An Eight–Input Barrel Shifter, Contemporary Logic Design, Chapter 4, Programmable and Steering Logic, The Benjamin/Cummings Publishing Company, Inc., 1994, pp. 224–229.

Goto et al., A 3.3–V 12–ns 16–Mb CMOS SRAM, IEEE Journal of Solid–State Circuits, vol. 27, No. 11, Nov. 1992, pp. 1490–1496.

Bursky, Triple–Port DRAM Fuels Graphic Displays, Design Innovation, Electronic Design, Apr. 30, 1987, pp. 53–54.

Drumm et al., Dual–Port Statis RAMs Can Remedy Contention Problems, Computer Design, Aug. 1984, pp. 145–151.

METHODS OF CONTROLLING MEMORY BUFFERS HAVING TRI-PORT CACHE ARRAYS THEREIN

This application is related to U.S. Pat. No. 5,999,478 entitled *Highly Integrated Tri-Port Memory Buffers Having Fast Fall-Through Capability and Methods of Operating Same;* U.S. Pat. No. 5,982,700 entitled *Buffer Memory Arrays Having Nonlinear Columns for Providing Parallel Data Access Capability and Methods of Operating Same;* and U.S. Pat. No. 5,978,307 entitled *Integrated Circuit Memory Devices Having Partitioned Multi-Port Memory Arrays Therein for Increasing Data Bandwidth and Methods of Operating Same,* the disclosures of which are hereby incorporated herein by reference.

FIELD OF THE INVENTION

The present invention relates to integrated circuit memory devices and methods of operating same, and more particularly to buffer memory devices and methods of operating buffer memory devices.

BACKGROUND OF THE INVENTION

Semiconductor memory devices can typically be classified on the basis of memory functionality, data access patterns and the nature of the data storage mechanism. For example, distinctions are typically made between read-only memory (ROM) devices and read-write memory (RWM) devices. The RWM devices typically have the advantage of offering both read and write functionality with comparable data access times. Typically, in RWM devices, data is stored either in flip-flops for "static" memory devices or as preset levels of charge on a capacitor in "dynamic" memory devices. As will be understood by those skilled in the art, static memory devices retain their data as long as a supply of power is maintained, however, dynamic memory devices require periodic data refreshing to compensate for potential charge leakage. Because RWM devices use active circuitry to store data, they belong to a class of memory devices known as "volatile" memory devices because data stored therein will be lost upon termination of the power supply. ROM devices, on the other hand, may encode data into circuit topology (e.g., by blowing fuses, removing diodes, etc.). Since this latter type of data storage may be hardwired, the data cannot be modified, but can only be read. ROM devices also typically belong to a class of memory devices known as "nonvolatile" memory devices because data stored therein will typically not be lost upon termination of the power supply. Other types of memory devices that have been more recently developed are typically referred to as nonvolatile read-write (NVRWM) memory devices. These types of memory devices include EPROM (erasable programmable read-only memory), $E^2$PROM (electrically erasable programmable read-only memory), and flash memories, for example.

An additional memory classification is typically based on the order in which data can be accessed. Here, most memory devices belong to the random-access class, which means that memory locations can be read from or written to in random order. Notwithstanding the fact that most memory devices provide random-access, typically only random-access RWM memories use the acronym RAM. Alternatively, memory devices may restrict the order of data access to achieve shorter data access times, reduce layout area and/or provide specialized functionality. Examples of such specialized memory devices include buffer memory devices such as first-in first-out (FIFO) memory devices, last-in first-out (LIFO or "stack") memory devices, shift registers and content-addressable memory (CAM) devices.

A final classification of semiconductor memories is based on the number of data input and data output ports associated with the memory cells therein. For example, although most memory devices have unit cells therein that provide only a single port which is shared to provide an input and output path for transfer of data, memory devices with higher bandwidth requirements often have cells therein with multiple input and output ports. However, the addition of ports to unit memory cells typically increases the complexity and layout area requirements for these higher bandwidth memory devices.

Single-port memory devices are typically made using static RAM cells if fast data access times are a requirement, and dynamic RAM cells if low cost is a primary requirement. Many FIFO memory devices use dual-port RAM based designs with self-incrementing internal read and write pointers to achieve fast fall-through capability. As will be understood by those skilled in the art, fall-through capability is typically measured as the time elapsing between the end of a write cycle into a previously empty FIFO and the time an operation to read that data may begin. Exemplary FIFO memory devices are more fully described and illustrated at section 2.2.7 of a textbook by A. K. Sharma entitled "Semiconductor Memories: Technology, Testing and Reliability", IEEE Press (1997).

In particular, dual-port SRAM-based FIFOs typically utilize separate read and write pointers to advantageously allow read and write operations to occur independently of each other and achieve fast fall-through capability since data written into a dual-port SRAM FIFO can be immediately accessed for reading. Since these read and write operations may occur independently, independent read and write clocks having different frequencies may be provided to enable the FIFO to act as a buffer between peripheral devices operating at different rates. Unfortunately, a major disadvantage of typical dual-port SRAM-based FIFOs is the relatively large unit cell size for each dual-port SRAM cell therein. Thus, for a given semiconductor chip size, dual-port buffer memory devices typically provide less memory capacity relative to single-port buffer memory devices. For example, using a standard DRAM cell as a reference unit cell consuming one (1) unit of area, a single-port SRAM unit cell typically may consume four (4) units of area and a dual-port SRAM unit cell typically may consume sixteen (16) units of area. Moreover, the relatively large unit cells of a dual-port SRAM FIFO limit the degree to which the number of write operations can exceed the number of read operations, that is, limit the capacity of the FIFO.

To address these limitations of dual-port buffer memory devices, single-port buffer memory devices have been developed to, among other things, achieve higher data capacities for a given semiconductor chip size. For example, U.S. Pat. No. 5,546,347 to Ko et al. entitled "Interleaving Architecture And Method For A High Density FIFO", assigned to the present assignee, discloses a preferred memory device which has high capacity and uses relatively small single-port memory cells. However, the use of only single port memory cells typically precludes simultaneous read and write access to data in the same memory cell which means that single-port buffer memory devices typically have slower fall-through time than comparable dual-port memory devices. Moreover, single-port buffer memory devices may use complicated arbitration hardware to control sequencing and queuing of reading and writing operations.

U.S. Pat. No. 5,371,708 to Kobayashi also discloses a FIFO memory device containing a single-port memory array, a read data register for holding read data from the memory array and a write data register for holding write data to the memory array. A bypass switch is also provided for transferring data from the write data register to the read data register so that the memory array can be bypassed during testing of the FIFO to detect the presence of defects therein. However, like the above-described single-port buffer memory devices, simultaneous read and write access to data is not feasible.

Thus, notwithstanding the above described buffer memory devices, there still exists a need to develop high speed buffer memory devices having expanded functionality, increased data capacity and reduced unit cell size.

SUMMARY OF THE INVENTION

It is therefore an object of the present invention to provide improved methods of operating buffer memory devices.

It is a further object of the present invention to provide methods of operating highly integrated buffer memory devices having memory cells therein with reduced lateral dimensions.

It is another object of the present invention to provide methods of operating buffer memory devices having expanded memory capacity.

It is another object of the present invention to provide methods of operating buffer memory devices having fast fall-through capability.

It is still another object of the present invention to provide methods of operating buffer memory devices having simultaneous read and write capability.

It is still a further object of the present invention to provide methods of efficiently arbitrating read and write operations in buffer memory devices to prevent gaps or stoppages in data transfer.

These and other objects, advantages and features of the present invention are provided by buffer memory devices (e.g., first-in first-out (FIFO) memory devices) which contain a custom multi-port memory cache array of moderate capacity and a substantially larger capacity supplemental memory array having cells therein with reduced unit cell size, and methods of operating same. According to one embodiment of the present invention, a preferred tri-port cache memory array is provided having a read port, a write port and a bidirectional input/output port. In this embodiment, the tri-port memory array is electrically coupled to the highly integrated and substantially larger capacity supplemental memory array (e.g., DRAM array) which may contain a plurality of columns and rows of single-port memory cells therein. The tri-port memory array communicates internally with the supplemental memory array via the bidirectional input/output port and communicates with external devices (e.g., peripheral devices) via the write and read data ports and input/output driver circuits coupled to the write and read data ports.

Efficient steering circuitry is also preferably provided as a bidirectional crosspoint switch to electrically couple terminals (lines IO and IOB (i.e., IO)) of the bidirectional input/output port of the tri-port memory array in parallel to bit lines (BL and BLB (i.e., BL)) in the supplemental memory array during a write-to-memory time interval and during a read-from-memory time interval. Circuitry is also preferably provided for controlling operation of the tri-port and supplemental memory arrays so that to the outside world the buffer memory device appears to have all the capacity of the large and highly integrated supplemental memory array, and all the features and functionality of a conventional dual-port-cell based buffer memory device (typically having much more limited capacity), such as extremely fast fall-through capability. In addition, the tri-port memory array is preferably designed as a plurality of separate registers of tri-port cells (e.g., registers A, B, C and D) and each register is preferably arranged as a plurality of nonlinear columns (e.g., serpentine-shaped or louvered-shaped columns) of tri-port cells.

According to a preferred aspect of the present invention, the arrangement of each register as a plurality of nonlinear columns of tri-port cells enables highly efficient parallel/serial transfer of data back and forth between all cells in a row of memory cells in the supplemental memory array and all columns in a selected register of tri-port cells. According to another preferred aspect of the present invention, a minimum of four registers is provided in the tri-port memory array so that there is always a current read register, an immediately available next-to-read register, a current write register and an immediately available next-to-write register. In particular, the use of four separate registers and efficient steering circuitry eliminates the possibility that gaps or stoppages will occur in the flow of data into and out of the buffer memory device during write and read operations, unless full or empty, respectively. Accordingly, by always maintaining a source of available read data, the present invention can be operated to emulate dual-port FIFOs with substantially reduced layout area requirements.

Moreover, a preferred arrangement of the tri-port memory array and steering circuitry enables the parallel transfer of a plurality of bits (e.g., 3 bits) of data from all columns of tri-port cells in a selected register thereof (e.g., A or B or C or D) to a row of memory cells in the supplemental memory array during a respective portion of the write-to-memory time interval and vice versa during a respective portion of the read-from-memory time interval. Using a sequence of consecutive parallel transfer operations, it is also possible to obtain parallel/serial transfer of all bits of data (e.g., 18 bits) from each of the columns in a selected register in the tri-port memory array to the supplemental memory array and vice versa with reduced layout wiring penalty. This advantage may be achieved even if the columns of tri-port cells in the registers are aligned in a generally orthogonal direction relative to a row of memory cells in the supplemental memory array. In addition, corresponding columns of tri-port cells in each register are aligned together in side-by-side relation to, among other things, improve integration density and reduce the complexity of the steering circuitry.

According to yet another preferred aspect of the present invention, the memory cells in the supplemental memory array may comprise dynamic random access memory (DRAM) cells having very substantially reduced unit cell size compared to the unit cell size of a conventional dual-port buffer memory device (e.g., dual-port FIFO) having dual-port SRAM cells therein. Here, the ratio of the number of memory cells in the supplemental memory array (e.g., DRAM array) relative to the number of potentially significantly larger tri-port cells (e.g., tri-port SRAM cells) is made so high that the total size of the supplemental memory cells and tri-port cells is only slightly greater than that of the supplemental memory array alone. For example, according to the preferred embodiment of the present invention having four (4) tri-port registers, the supplemental memory array may be designed to contain 2048 rows×2304 columns 4,718,592 DRAM cells. The tri-port memory array may be designed to contain 4×18×128=9216 tri-port cells. Thus, even if the unit cell size of a tri-port cell (e.g., SRAM tri-port cell) were to be thirty two (32) times as large as the unit cell size of a single DRAM cell, the total area of DRAM and tri-port cells would only be 6.25% greater than the total area of the DRAM cells alone. Therefore, the present invention may consume a total area which is approximately equal to a conventional DRAM device of equal capacity. However, to the outside world, the present invention provides a sequential buffer memory device with the most preferred features of a current state-of-the-art dual-port-cell based buffer memory device, yet requires only a fraction of the area.

Another embodiment of the present invention provides methods of operating buffer memory devices which include the steps of writing first data from external to the buffer memory device into a first register within a tri-port memory array having a read port, a write port and a bidirectional input/output port. This step may be performed at a maximum write rate during burst write mode operation to fill the first register during a minimum write-to-register time interval. This minimum write-to-register time interval typically has a duration that is a function of the depth of the first register and the write cycle frequency, among other things. For example, assuming a 10 ns minimum duration for writing a 36 bit word of data (as two 18 bit half-words) into a register having a capacity of 18 bits×128 words (i.e., 2304 bits), a minimum write-to-register time interval of 640 ns would typically apply. Then, a step may be performed to transfer all of the first data from the first register to an internal supplemental memory array during a write-to-memory time interval. Preferably, the duration of the write-to-memory time interval is less than about one half the duration of the minimum write-to-register time interval if the supplemental memory array contains SRAM cells or is less than about one third the duration of the minimum write4o-register time interval if the supplemental memory array contains DRAM cells (which require refresh). This transfer step is typically performed while additional write data is being written into another register in the tri-port memory array.

For example, using the above described steering circuitry, the entire contents of the first register may be transferred via the bidirectional input/output port to a single row of memory cells in the supplemental memory array. According to a preferred aspect of this transfer step, 384 bits of data may be transferred in parallel during each of six (6) consecutive time intervals within the write-to-memory time interval. To enable the data in the supplemental memory array to be read, a step will also be performed to transfer the first data from the row of memory cells in the supplemental memory array back into the tri-port memory array, during a read-from-memory time interval which may have duration about equal to the write-to-memory time interval. In the event the tri-port memory array contains four (4) registers of tri-port cells, this step of transferring the first data out of the row of memory cells may include the step of transferring parallel packets of the first data into a second register (or back into the first register) during each of six (6) consecutive time intervals within the read-from-memory time interval. Finally, a step may be performed to read the first data in a first-in first-out sequence from the second register, during a read-from-register time interval. This step may be performed at a maximum rate during burst read mode operation to read the second register during a minimum read-from-register time interval which typically equals the minimum write-to-register time interval.

According to a further preferred aspect of the present invention, the supplemental memory array is a dynamic random access memory array and each row of cells therein may be periodically refreshed during a respective refresh cycle which preferably has a duration less than or equal to the duration of the read-from-memory or write-to-memory time interval. In particular, to always maintain a source of available read data even under worst case operating conditions and achieve other advantages, the sum of the durations of a refresh cycle, the write-to-memory time interval and the read-from-memory time interval is preferably less than the duration of the minimum write-to-register time interval or minimum read-from-register time interval. Thus, the capacities and dimensions of the registers and the supplemental memory array can be optimally chosen based on the design rules of a particular implementation technology to achieve a buffer memory device having extremely high capacity with reduced chip dimensions, wide data width operation, very low latency operation and extremely fast read and write cycle times.

According to still another embodiment of the present invention, methods of operating the above-described buffer memory devices as first-in first-out sequential memory buffers include the steps of reading data from a current read register in the cache memory device to an external peripheral device, and writing data from an external peripheral device to a current write register in the cache memory array. Tri-port controller logic is also preferably provided for performing read and write arbitration operations to make next-to-read and next-to-write registers available in the cache memory array. To always maintain a source of available data for reading or available space for writing, even under worst case operating conditions including burst mode operation, the step of performing write arbitration comprises determining a next-to-write register as a first free register in the cache memory array if the current read and write registers are different registers, or as the next-to-read register if the current read and write registers are the same register. The step of performing read arbitration preferably comprises determining a next-to-read register as the current write register if the current write register contains next-to-read data relative to the data in the current read register. The step of performing read arbitration may also comprise determining the next-to-read register as a second free register in the cache memory array if the current read and write registers are different registers and the next-to-read register is not the current write register, or as the next-to-write register if the current read and write registers are the same register.

Preferably, the step of determining a next-to-read register as the second free register is closely followed by the step of transferring next-to-read data relative to the data in the current read register from the supplemental memory array to the second free register. Moreover, in the event the memory device contains read row and write row pointers which point to respective rows in the supplemental memory array, the step of performing read arbitration is preferably preceded by the step of updating the read row pointer so that the value of the read row pointer can be used during read arbitration. For example, a step can be performed to compare the values of the read row and write row pointers and then assign one of the four registers in the cache memory array as the next-to-read register based on the outcome of the comparison. This next-to-read register then receives next-to-read data relative to the data in the current read register. Here, the write row pointer is controlled to point to a current write row in the supplemental memory array which is to receive data from the current write register once the current write register has been filled. The read row pointer may also be controlled to point to a row in the supplemental memory array which contains next-to-read data relative to the data in the current read register. Then, during performance of the read arbitration step, the next-to-read register is determined as the current write register if the read row pointer points to the current write row when the step of comparing the read row and write row pointers is performed.

The step of writing data to a current write register also preferably includes the steps of latching the value of the write row pointer, then updating the write row pointer to point to a row in the supplemental memory array that is allocated to receive data in the current write register, and then transferring data from a previous write register in the cache memory array to a row in the supplemental memory array which corresponds to the latched value of the write row pointer. Accordingly, by always maintaining a source of available read data using efficient transfers of next-to-read data from the supplemental memory array, the preferred memory buffers can be operated to emulate dual-port FIFOs having fast fall-through capability, reduced layout area requirements and expanded capacity equivalent to at least the capacity of the supplemental memory.

DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
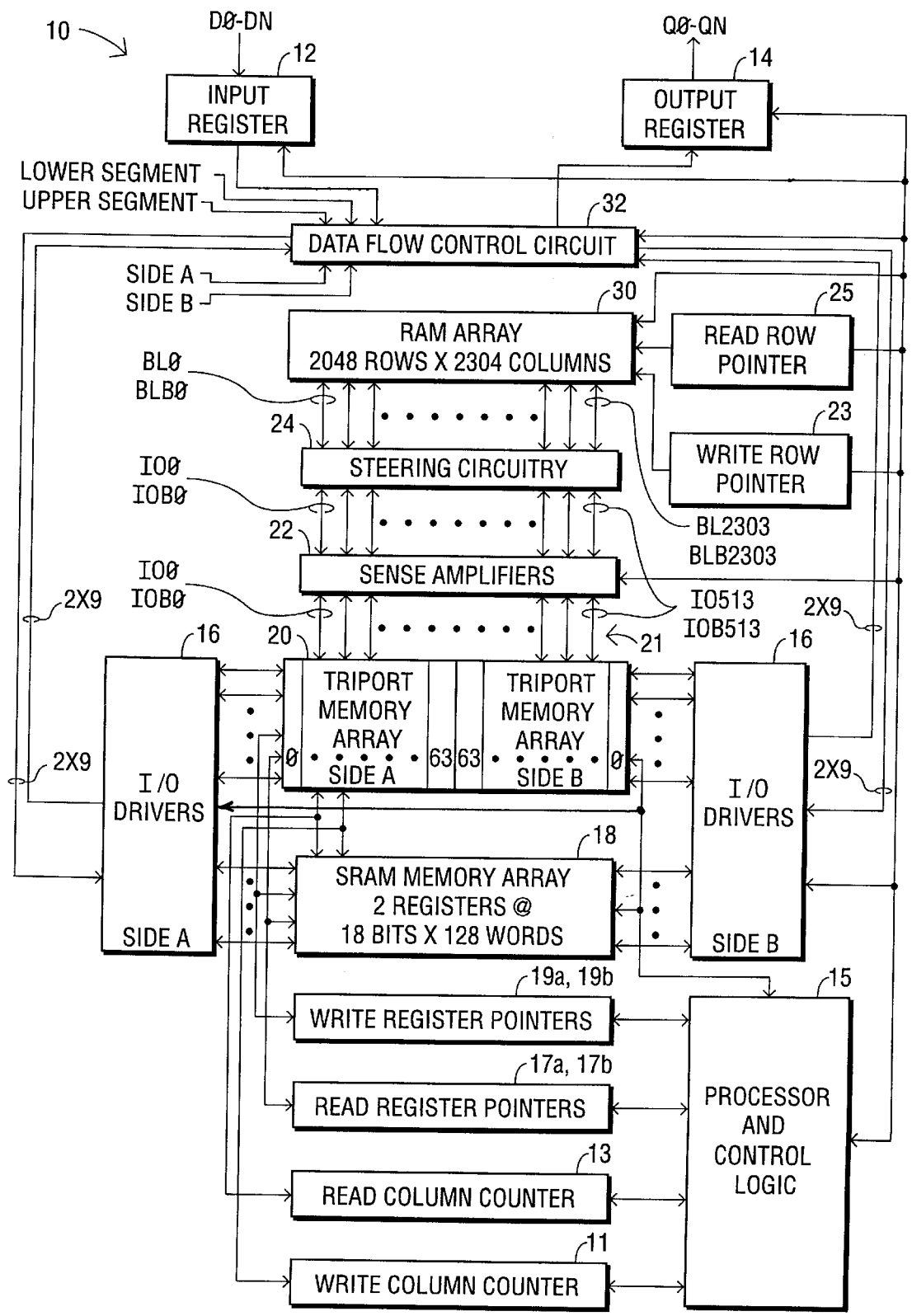
FIG. 1 is a block diagram of a first-in first-out (FIFO) buffer memory device according to a first embodiment of the present invention.

Referring now to FIG. 1, a preferred buffer memory device 10 according to a first embodiment of the present invention is illustrated. In this device 10, an input register 12 may be provided as an interface register so that input data (DO-Dn) to be written into the buffer memory device 10 can be supplied from an external peripheral device in a preferred parallel format. In particular, the input register 12 may be a 9-bit, 18-bit or 36-bit input register, for example, so that binary words or portions thereof may be simultaneously loaded into the buffer memory device 10. Similarly, an output register 14 may be provided as an interface register so that output data (QO-Qn) to be read from the buffer memory device 10 can be supplied to an external peripheral device. As will be understood by those skilled in the art, in the event the buffer memory device 10 is embodied as an integrated circuit on a semiconductor chip, the input and output registers may be electrically connected to respective input and output pads (not shown) on the semiconductor chip.

As illustrated, the input register 12 and output register 14 may be electrically coupled by a multi-bit bus to a data flow control circuit 32. The data flow control circuit 32 is also electrically coupled via a plurality of multi-bit buses to a pair of input/output (I/O) driver circuits 16. These input/output driver circuits 16 may comprise read and write drivers and sense amplifiers for transferring data to and from a dual-port or single-port memory array 18 (e.g., SRAM array) containing two registers therein (to support a retransmit function if needed), and a tri-port memory array 20 (e.g., tri-port SRAM array) containing four tri-port registers (A,B,C and D) therein. According to a preferred aspect of the present invention, each of the tri-port registers may have the capacity of retaining 64 words of 36 bit data (i.e., 2304 bits) in columns containing 18 tri-port SRAM cells each. Here, the term "tri-port" is used to describe a memory cell or array thereof having at least three ports. This capacity may also be preferably configured as 256 words of 9 bit data or 128 words of 18 bit data, for example. In particular, in the event 36 bit words are used, improved writing and reading performance can be achieved by utilizing both input/output driver circuits 16 to simultaneously write or read the 18 bit LSB and 18 bit MSB portions of the 36 bit word into and from the tri-port memory array 20 during a single write or read clock cycle.

According to a preferred aspect of present invention, the data flow control circuit 32 contains a crosspoint switch for facilitating bidirectional routing of data between the input and output registers 12 and 14 and the first and second input/output driver circuits 16 via the plurality of multi-bit (e.g., 9-bit) buses. As illustrated, the data flow control circuit 32 is responsive to lower and upper segment signals and side A and side B select signals. In particular, in the event the buffer memory device 10 is configured by a user or manufacturer to handle 36-bit input words, the lower and upper segment signals and side A and side B select signals may be generated internally by a processor and control logic circuit 15. These signals may be used to route an 18-bit LSB portion of each 36-bit word received by the input register 12 to the "SIDE A" input/output driver circuit 16 (using two 9-bit buses) in parallel with the routing of an 18-bit MSB portion of each 36-bit word to the "SIDE B" input/output driver circuit 16. The lower and upper segment signals may also be used to control routing of lower and upper segments of each 18-bit portion of the data input word into lower (or upper) and upper (or lower) portions of each column of memory cells in the tri-port memory array 20, by selectively routing the lower and upper segments of each 18 bit portion of the data input word to a particular 9-bit bus using multiplexers internal to the data flow control circuit 32.

This aspect of the data flow control circuit 32 can be particularly useful for users wanting to preserve or reconfigure data in big "endian" or little "endian" format during a write operation, and may also eliminate the need to multiplex output data being read from the tri-port memory array 20, using multiplexers that are serially connected in the output paths and could provide additional delay during reading operations. Here, as will be understood by those skilled in the art, the term "endian" refers to the particular placement of bytes within a word of data. For example, in the event the memory device 10 is configured to enable writing of 9-bit words and reading of 18-bit words, the lower and upper segment signals may be utilized to control routing of two 9-bit input words into lower and upper portions of a single column of tri-port cells in the tri-port memory array 20 during consecutive write clock cycles so that 1 8-bit words can be retrieved directly (in the user selected little or big "endian" format) during read operations which require only one read clock cycle for each 18 bit word that is read.

As described more fully hereinbelow, the tri-port memory array 20 includes a bidirectional input/output port 21 that is electrically coupled to a supplemental single-port memory array 30 (e.g., DRAM or SRAM array). Based on the above described capacity for each tri-port register of 64 words of 36 bit data, the bidirectional input/output port may be preferably configured as 514 tri-port terminals. Each tri-port terminal is comprised of a pair of input/output lines IO and IOB (i.e., ($IO_D$, $IOB_0$), . . . , ($IO_{513}$, $IOB_{513}$)). An array 22 of sense amplifiers (e.g., linear array of 514 sense amplifiers) is also electrically coupled at a first end to the bidirectional input/output port, as illustrated. As will be understood by those skilled in the art, precharge and line equalization circuits (not shown) may be provided to set each input/output line $IO_n$ and complementary input/output line $IOB_n$ at the same potential (e.g., Vdd, ½Vdd) just prior to performance of a sense operation for determining the relative differential states of the input/output line pairs upon application of data thereto and then driving the lines in a pair to opposing rail voltages (e.g., Vss and Vdd). To reduce excessive power consumption caused by unnecessary charging of input/output lines being sensed, the array 22 of sense amplifiers preferably includes multiplexer circuits to isolate the input/output lines on one side of the array 22 when the input/output lines on the other side are being driven rail-to-rail. Thus, when a slight differential potential is established across a respective input/output line pair $IO_n$ and $IOB_n$ on the side of the tri-port memory array 20 (i.e., the "sensed" side) during an operation to transfer tri-port data to the supplemental memory array 30, the respective input/output lines on the side of the steering circuitry 24 are driven rail-to-rail but the corresponding input/output lines on the sensed side are allowed to float. Similarly, when a slight differential potential is established across a respective input/output line pair $IO_n$ and $IOB_n$ on the side of the steering circuitry 24 during an operation to fetch data from the supplemental memory array 30, the respective input/output lines on the tri-port side of the array 22 are driven rail-to-rail but the lines being sensed are allowed to float.

Preferred steering circuitry 24, in the form of a crosspoint switch, is also electrically coupled between a second end of the array 22 of sense amplifiers and the supplemental memory array 30. As described more fully hereinbelow, the crosspoint switch contains multiplexer and demultiplexer circuits. therein to selectively route a reduced number of pairs of input/output lines IO and IOB at the bidirectional input/output port to a greater number of pairs of bit lines BL and BLB in the supplemental memory array 30 and vice versa, in response to register transfer and column select signals. Each of these pairs of bit lines BL and BLB may be electrically coupled to a respective column of memory cells in the supplemental memory array 30. As illustrated, the preferred steering circuitry 24 may be provided for routing 514 pairs of input/output lines to 2304 pairs of bit lines in the supplemental memory array 30 containing 2K rows (K=1024). These 2K rows of memory cells may be formed by grouping together eight (8) blocks of memory having 256 rows each, for example. Moreover, by routing data input/output lines numbering less than one-quarter the number of bit lines, the substantially greater layout pitch requirements of the input/output lines IO and IOB (relative to the layout pitch of the bit lines BI and BLB) can be accommodated. As described more fully hereinbelow, 384 complementary pairs of bidirectional data lines communicate to or from the supplemental memory array 30. In the preferred embodiment, these lines pass directly over the eight (8) blocks of memory in the top layer of metal interconnect, parallel to the bit lines in the supplemental memory array 30.

Referring still to FIG. 1, processor and control logic 15 is also provided for controlling operation of the above-described circuits. Among other things, the control logic 15 provides information generated by a number of counters and pointers to control operation of the buffer memory device 10 as a sequential buffer memory device (e.g., FIFO, LIFO). The control logic 15 may provide information such as (1) write register pointers 19a, 19b which may designate a current write register and a next-to-write register in the tri-port memory array 20, respectively, (2) a write-column counter 11 which designates a column of tri-port memory cells in the current write register receiving current write data, (3) read register pointers 17a, 17b which may designate a current read register and a next-to-read register in the tri-port memory array 20, respectively, (4) a read-column counter 13 which designates a column of tri-port memory cells in the current read register from which current read data is being read, (5) a read row counter/pointer 25 which may point to a row in the supplemental memory array 30 that contains data to be loaded into the next-to-read register, and (6) a write row counter/pointer 23 which may point to a row in the supplemental memory array 30 which is to receive data in the current write register.

In contrast to the tri-port memory array 20 which is electrically coupled to the supplemental memory array 30, the dual-port or single-port memory array 18, which need not be coupled to the supplemental memory array 30, may be operated as a retransmit memory buffer so that a retransmit-from-mark operation may begin with zero cycle latency. In particular, the single or dual-port memory array 18 may contain data which immediately follows data that was marked during reading or writing operations. Then, upon receipt of a retransmit-from-mark request by a user, the retransmit data in the memory array 18 may be immediately read while operations are simultaneously performed to transfer additional retransmit data from the supplemental memory array 30 to the tri-port memory array 20. This additional retransmit data can then be read from the tri-port memory array 20 once all the data in the single or dual-port memory array 18 has been read.

Figure 2:
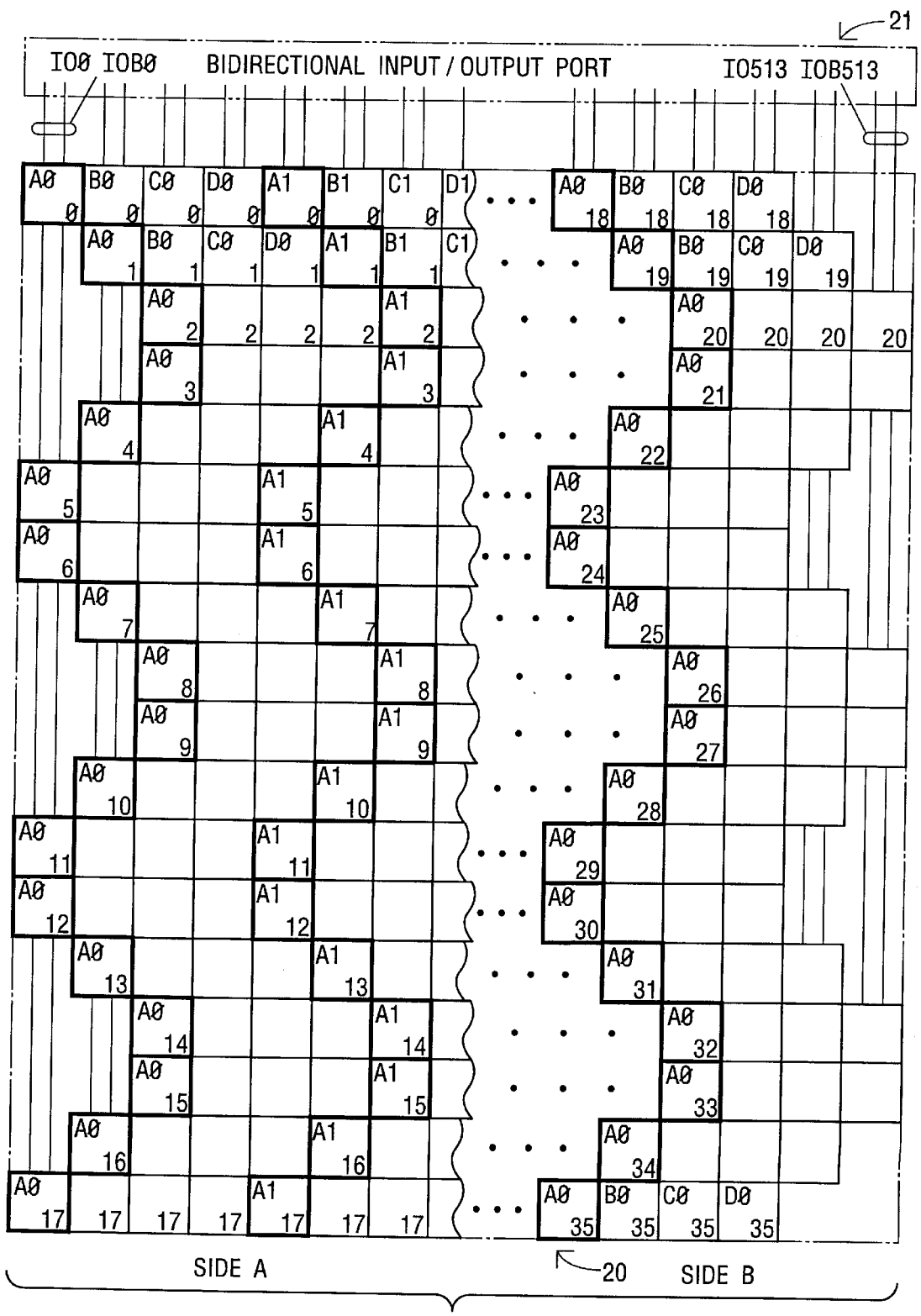
FIG. 2 is a block layout schematic that illustrates a preferred tri-port memory array containing four bifurcated registers of tri-port memory cells arranged as a plurality of serpentine-shaped columns of memory cells, according to the first embodiment of the present invention.

Referring now to FIG. 2, a first tri-port register (e.g., register A) may be defined as two subarrays of tri-port memory cells with each subarray containing 64 serpentine-shaped columns A0–A63 positioned side-by-side at spaced locations. The first subarray may be located on side A of the tri-port memory array 20 and the second subarray may be located on side B. The tri-port memory cells on side A are also electrically coupled by respective read and write data lines ((RB, RBB) and (WB, WBB)) to the side A input/output driver circuit 16 and the tri-port memory cells on side B are electrically coupled by respective read and write data lines to the side B input/output driver circuit 16, as illustrated best by FIGS. 1 and 3. In the first columns A0 of the first tri-port register A, cells 0–17 and 18–35 are aligned as a nonlinear columns at opposite sides of the tri-port array 20. Each of the first columns A0 has three (3) cells for each of six (6) staggered segments which trace a zig-zag pattern. The 63$^{rd}$ column A63 on side A of the first tri-port register A contains cells 0–17 and the 63rd column A63 on side B contains cells 18–35. As illustrated, the columns may be arranged side-by-side in each subarray with the lower order columns (e.g., A0) extending adjacent opposite ends of the tri-port array 20 and the higher order columns (e.g., A63) extending adjacent the middle of the tri-port array 20. Thus, when viewed from left-to-right, the columns of register A may be arranged in the following sequence: $A0_{0-17}$, $A1_{0-17}$, $A2_{0-17}$, . . . , $A63_{0-17}$, $A63_{18-35}$, $A62_{18-35}$, . . ., $A0_{18-35}$, for example. Alternatively, the columns may be arranged side-by-side so that when viewed from left-to-right, the columns of register A may be arranged in the following sequence: $A0_{0-17}$, $A1_{0-17}$, $A2_{0-17}$, . . . , $A63_{0-17}$, $A0_{18-35}$, $A1_{18-35}$, . . . , $A63_{8-35}$. This latter sequence will likely be preferred in order to simply the design of the column decoder logic.

Based on this preferred configuration, a 36-bit word can be written as first and second 18-bit subwords into tri-port cells $A0_{0-17}$ and $A0_{18-35}$, during a single write clock cycle, and then another 36-bit word can be split into subwords by the data flow control circuit 32 and written into tri-port cells $A1_{0-17}$ and $A1_{18-35}$ during a single write clock cycle. These writing steps can be repeated with respect to register A until tri-port cells $A63_{0-17}$ and $A63_{18-35}$ have received the $64^{th}$ word. According to another preferred configuration which utilizes the lower and upper segment signals generated by the processor and control logic 15, four 9-bit words can be loaded into tri-port cells $A0_{0-8}$, $A0_{9-17}$, $A0_{18-26}$ and $A0_{27-35}$ during four consecutive write clock cycles and then these four 9-bit words can be read from columns A0 as a single 36-bit word during a single read clock cycle.

According to another aspect of the preferred embodiment, the first and second columns A0 and A1 of register A are also separated by three serpentine-shaped columns of cells from other registers. In particular, corresponding columns of each of the registers (e.g., A0,B0,C0 and D0) are grouped together as four closely adjacent columns.

Alternatively, each register within the tri-port memory array 20 may be arranged as a plurality of louvered-shaped columns of memory cells containing six discontinuous segments (A0–A2, A3–A5, A6–A8, A9–A11, A12–A14, A15–A17), as described more fully in U.S. application Ser. No. 09/082,855 entitled "Highly Integrated Tri-Port Memory Buffers Having Fast Fall-Through Capability and Methods of Operating Same" (Attorney Docket No. 5646-11), the disclosure of which is hereby incorporated herein by reference.

Figure 3:
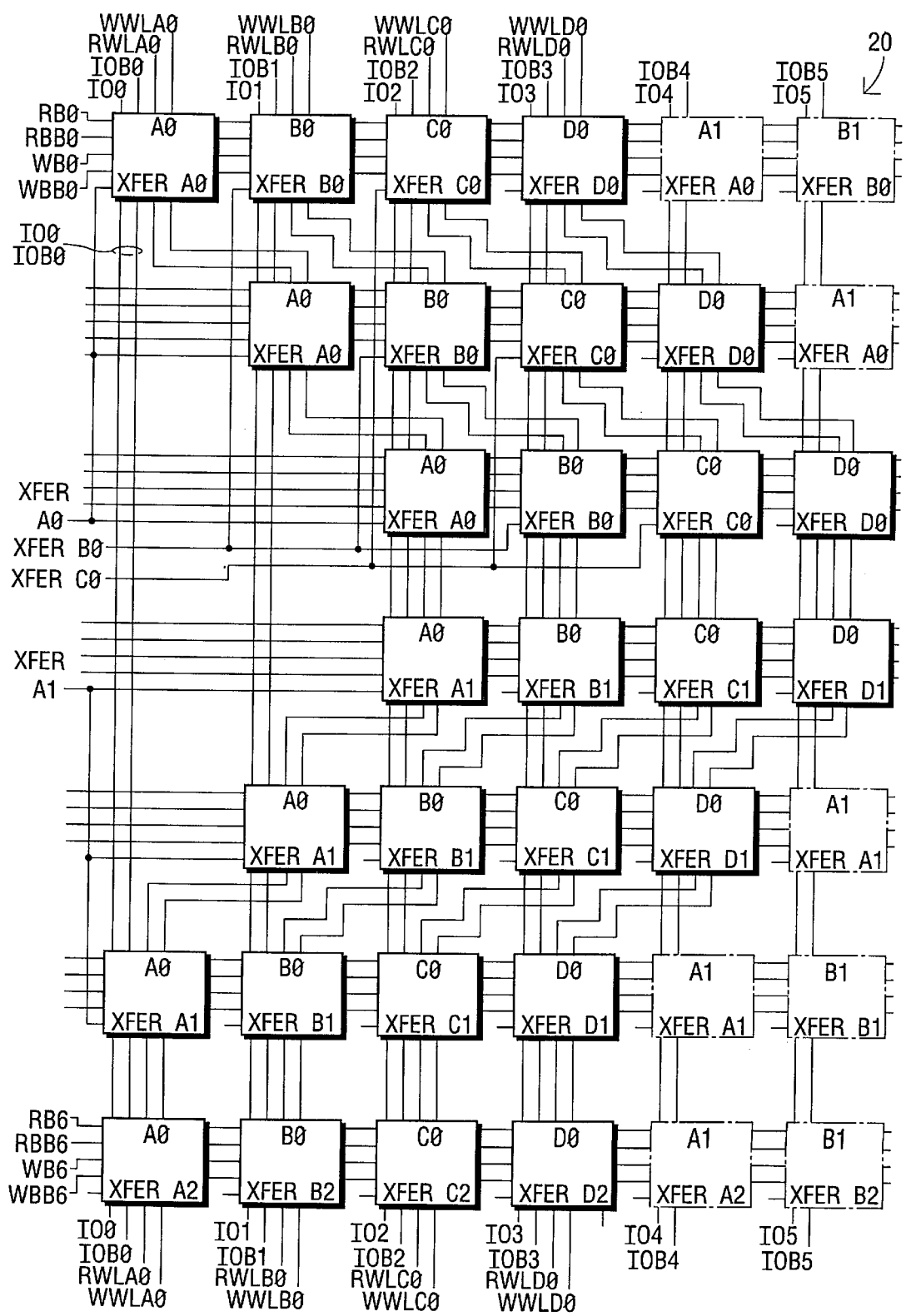
FIG. 3 is an electrical schematic that illustrates the electrical interconnections between tri-port cells 0–6 in columns A0, B0, C0 and D0, according to the tri-port memory array of FIG. 2.

Referring now to FIG. 3, an electrical schematic is provided to further illustrate the electrical interconnections between the tri-port cells 0–6 in columns A0, B0, C0 and D0 of FIG. 2. The other tri-port cells in the tri-port memory array 20 are similarly connected. In particular, read word lines (RWL) controlled by current read register pointer 17a and read column counter 13 and write word lines (WWL) controlled by current write register pointer 19a and write column counter 11 are provided as a pair of adjacent serpentine-shaped word lines for each nonlinear column of cells. For example, all 18 bits of column A0 of register A are responsive to read word line RWLA0 for data output and write word line WWLA0 for data input. These read and write word lines preferably trace a zig-zag pattern, as illustrated. Similarly, columns B0, C0 and D0 are responsive to their respective word lines: (RWLB0, WWLB0), (RWLC0, WWLC0) and (RWLD0, WWLD0). Pairs of parallel differential input/output lines (IO0, IOB0), (IO1, IOB1), (IO2, IOB2) and (IO3, IOB3) are also provided in a vertical direction. Each of these pairs of input/output lines comprises a terminal of the above-described bidirectional input/output port 21. According to the layout of cells illustrated by FIG. 2, lines IO0 and IOB0 span six (6) cells in column A0, lines IO1 and IOB1 span six (6) cells in each of columns B0 and A0, lines IO2 and IOB2 span six (6) cells in each of columns C0, B0 and A0, lines IO3 and IOB3 span six (6) cells in each of columns D0, C0 and B0, lines IO4 and IOB4 span six (6) cells in each of columns A1, D0 and C0 and lines IO5 and IOB5 span six (6) cells in each of columns B1, A1 and D0. Alternatively, although less preferred, the read and write word lines can be patterned as straight vertical lines and the pairs of differential input/output lines can be made to trace a zig-zag pattern (which means the input/output lines may have considerable additional capacitance relative to the preferred case). In this less preferred case, each of the columns of tri-port cells may be patterned as linear columns. Horizontal, read and write data lines ((RB0, RBB0), . . . , (RB17, RBB17)) and ((WB0, WBB0), . . . , (WB17, WBB17)) on side A of the tri-port array 20 are also electrically coupled to the side A input/output driver circuit 16. These data lines extend across rows of tri-port cells so that read and write data can be efficiently transferred between the side A input/output driver circuit 16 and the columns of tri-port cells on side A of the tri-port memory array 20. Similarly, read and write data lines ((RB18, RBB18), . . . , (RB35, RBB35)) and ((WB18, WBB18), . . . , (WB35, WBB35)) on side B of the tri-port array 20 are electrically coupled to the side B input/output driver circuit 16.

As described more fully hereinbelow with respect to FIG. 5, complementary data (e.g., DATA, DATAB) stored at latched internal nodes of a selected tri-port memory cell may be provided to a respective pair of input/output lines by providing a respective transfer signal to the selected cell. The transfer signals include six (6) transfer signals for each of the four (4) registers of tri-port cells in the tri-port memory array 20, for a total of twenty four (24) transfer signals. In FIG. 3, half of these twenty four (24) transfer signals are illustrated as XFERA0, XFERA1 and XFERA2, XFERB0, XFERB1 and XFERB2, XFERC0, XFERC1 and XFERC2 and XFERD0, XFERD1 and XFERD2. Each of these illustrated transfer signals is electrically coupled to a corresponding group of three (3) staggered cells within all columns of the same register. For example, transfer signal XFERA0 can be applied as a logic 1 signal to cells 0–2 of all A columns during a first portion of a write-to-memory time interval. Referring specifically to column A0, complementary data within cells 0–2 can be simultaneously transferred to the first three pairs of input/output lines (IO0, IOB0), (IO1, IOB1) and (IO2 and IOB2), respectively. At the same time, the first three (3) bits of column A1 are being transferred to input/output lines (IO4, IOB4), (IO5, IOB5) and (IO6, IOB6). Similarly, the first three (3) bits of all 128 columns of register A are transferred together. Note, that IO3 and IOB3 are not used during this transfer operation as they do not serve the A register. Thus, 384 bits of data (3 bits×128 columns) from cells 0–2 of register A can be simultaneously transferred to 384 of the 514 ports in the bidirectional input/output port 21 illustrated by FIGS. 1–3. This transfer of complementary data can then be sensed and amplified by the array 22 of sense amplifiers using techniques well known to those skilled in the art. Similarly, transfer signal XFERA1 can be applied as a logic 1 signal to cells 3–5 of column A0 (and all other A columns) during a second portion of a write-to-memory time interval so that complementary data within cells 5, 4 and 3 can be simultaneously transferred to input/output lines (IO0, IOB0), (IO1, IOB1) and (IO2 and IOB2), respectively.

Following in the same manner, transfer signal XFERA2 can be applied as a logic 1 signal to cells 6–8 of column A0 (and all other A columns) during a third portion of a write-to-memory time interval. Referring specifically to column A0, data within cells 6, 7 and 8 can be simultaneously transferred to input/output lines (IO0, IOB0), (IO1, IOB1) and (IO2 and IOB2), respectively. Similarly, transfer signal XFERA3 (not shown) can be applied as a logic 1 signal to cells 11–9 of column A0 (and all other A columns) during a fourth portion of a write-to-memory time interval so that complementary data within cells 11, 10 and 9 can be simultaneously transferred to input/output lines (IO0, IOB0), (IO1, IOB1) and (IO2 and IOB2), respectively. Transfer signal XFERA4 (not shown) can also be applied as a logic 1 signal to cells 12–14 of column A0 (and all other A columns) during a fifth portion of a write-to-memory time interval so that complementary data within cells 12, 13 and 14 can be simultaneously transferred to input/output lines (IO0, IOB0), (IO1, IOB1) and (IO2 and IOB2), respectively.

Finally, transfer signal XFERA5 (not shown) can be applied as a logic 1 signal to cells 17–15 of column A0 (and all other A columns) during a sixth portion of a write-to-memory time interval so that complementary data within cells 17, 16 and 15 can be simultaneously transferred to input/output lines (IO0, IOB0), (IO1, IOB1) and (IO2 and IOB2), respectively.

By a similar method of operation with respect to register B, transfer signal XFERB0 can be applied as a logic 1 signal to cells 0–2 of column B0 (and all other B columns in register B) during a first portion of a write-to-memory time interval so that complementary data within each cell can be simultaneously transferred to the second, third and fourth pairs of input/outputs lines (IO1, IOB1), (IO2, IOB2) and (IO3 and IOB3), respectively. As described more fully hereinbelow with respect to FIGS. 4A–4D, the above described operations can be repeated to load the entire contents of register A, register B, register C or register D one-at-a-time into a row(s) of memory cells in the supplemental memory array 30, during respective write-to-memory time intervals which may have a duration of less than about 200 ns. Using similar operations, the entire contents of a row of memory cells in the supplemental memory array 30 (e.g., 2304 bits) may be loaded into a selected register (A, B, C or D) during six (6) consecutive portions of a read-from-memory time interval (i.e., "fetch" interval).

These write-to-memory and read-from-memory operations may be more fully understood by reference to TABLES 1–4 below. In particular, TABLE 1 illustrates a possible sequence of parallel data transfers from the tri-port register A illustrated by FIG. 2 to a single row (or possibly a plurality of rows) of memory cells in the supplemental memory array 30, during a write-to-memory time interval which may contain six nonoverlapping transfer intervals therein. TABLES 2–4 similarly illustrate the sequence of parallel data transfers from registers B, C and D, respectively, to the supplemental memory array 30.

TABLE 1

| TRANSFER SIGNAL | WORD0 LSB | WORD1 LSB | ... | WORD63 LSB | WORD63 MSB | ... | WORD0 MSB |
|---|---|---|---|---|---|---|---|
| XFERA0: | A0(0–2) | A1(0–2) | ... | A63(0–2) | A63(18–20) | ... | A0(18–20) |
| XFERA1: | A0(3–5) | A1(3–5) | ... | A63(3–5) | A63(21–23) | ... | A0(21–23) |
| XFERA2: | A0(6–8) | A1(6–8) | ... | A63(6–8) | A63(24–26) | ... | A0(24–26) |
| XFERA3: | A0(9–11) | A1(9–11) | ... | A63(9–11) | A63(27–29) | ... | A0(27–29) |
| XFERA4: | A0(12–14) | A1(12–14) | ... | A63(12–14) | A63(30–32) | ... | A0(30–32) |
| XFERA5: | A0(15–17) | A1(15–17) | ... | A63(15–17) | A63(33–35) | ... | A0(33–35) |

TABLE 2

| TRANSFER SIGNAL | WORD0 LSB | WORD1 LSB | ... | WORD63 LSB | WORD63 MSB | ... | WORD0 MSB |
|---|---|---|---|---|---|---|---|
| XFERB0: | B0(0–2) | B1(0–2) | ... | B63(0–2) | B64(18–20) | ... | B0(18–20) |
| XFERB1: | B0(3–5) | B1(3–5) | ... | B63(3–5) | B64(21–23) | ... | B0(21–23) |
| XFERB2: | B0(6–8) | B1(6–8) | ... | B63(6–8) | B64(24–26) | ... | B0(24–26) |
| XFERB3: | B0(9–11) | B1(9–11) | ... | B63(9–11) | B64(27–29) | ... | B0(27–29) |
| XFERB4: | B0(12–14) | B1(12–14) | ... | B63(12–14) | B64(30–32) | ... | B0(30–32) |
| XFERB5: | B0(15–17) | B1(15–17) | ... | B63(15–17) | B64(33–35) | ... | B0(33–35) |

TABLE 3

| TRANSFER SIGNAL | WORD0 LSB | WORD1 LSB | ... | WORD63 LSB | WORD63 MSB | ... | WORD0 MSB |
|---|---|---|---|---|---|---|---|
| XFERC0: | C0(0–2) | C1(0–2) | ... | C63(0–2) | C64(18–20) | ... | C0(18–20) |
| XFERC1: | C0(3–5) | C1(3–5) | ... | C63(3–5) | C64(21–23) | ... | C0(21–23) |
| XFERC2: | C0(6–8) | C1(6–8) | ... | C63(6–8) | C64(24–26) | ... | C0(24–26) |
| XFERC3: | C0(9–11) | C1(9–11) | ... | C63(9–11) | C64(27–29) | ... | C0(27–29) |
| XFERC4: | C0(12–14) | C1(12–14) | ... | C63(12–14) | C64(30–32) | ... | C0(30–32) |
| XFERC5: | C0(15–17) | C1(15–17) | ... | C63(15–17) | C64(33–35) | ... | C0(33–35) |

TABLE 4

| TRANSFER SIGNAL | WORD0 LSB | WORD1 LSB | ... | WORD63 LSB | WORD63 MSB | ... | WORD0 MSB |
|---|---|---|---|---|---|---|---|
| XFERD0: | D0(0–2) | D1(0–2) | ... | D63(0–2) | D63(18–20) | ... | D0(18–20) |
| XFERD1: | D0(3–5) | D1(3–5) | ... | D63(3–5) | D63(21–23) | ... | D0(21–23) |
| XFERD2: | D0(6–8) | D1(6–8) | ... | D63(6–8) | D63(24–26) | ... | D0(24–26) |
| XFERD3: | D0(9–11) | D1(9–11) | ... | D63(9–11) | D63(27–29) | ... | D0(27–29) |
| XFERD4: | D0(12–14) | D1(12–14) | ... | D63(12–14) | D63(30–32) | ... | D0(30–32) |
| XFERD5: | D0(15–17) | D1(15–17) | ... | D63(15–17) | D63(33–35) | ... | D0(33–35) |

Referring still to FIG. 3, two groups of four (4) horizontal data lines are also provided for each row (e.g., 18 rows) of tri-port cells in the tri-port memory array 20. As will be understood by those skilled in the art, these data lines are preferably electrically coupled to the left or right side I/O circuits 16 of FIG. 1. As illustrated, left side data lines for each row of cells include two (2) complementary read data lines RB and RBB and two (2) complementary write data lines WB and WBB. These left side data lines are electrically coupled to the 64 left side columns (0–63) of each of registers A, B, C and D. Right side data lines (not shown) are electrically coupled to the 64 right side columns (63–0) of each of registers A, B, C and D. Here, the use of separate right side and left side data lines enables the simultaneous loading of 36 bits of data as a first group of 18 bits and a second group of 18 bits, into respective left side and right side columns having 18 tri-port cells therein. The ability to read data from and write data into individual tri-port cells will be described more fully hereinbelow with respect to FIG. 6.

Figure 4A:
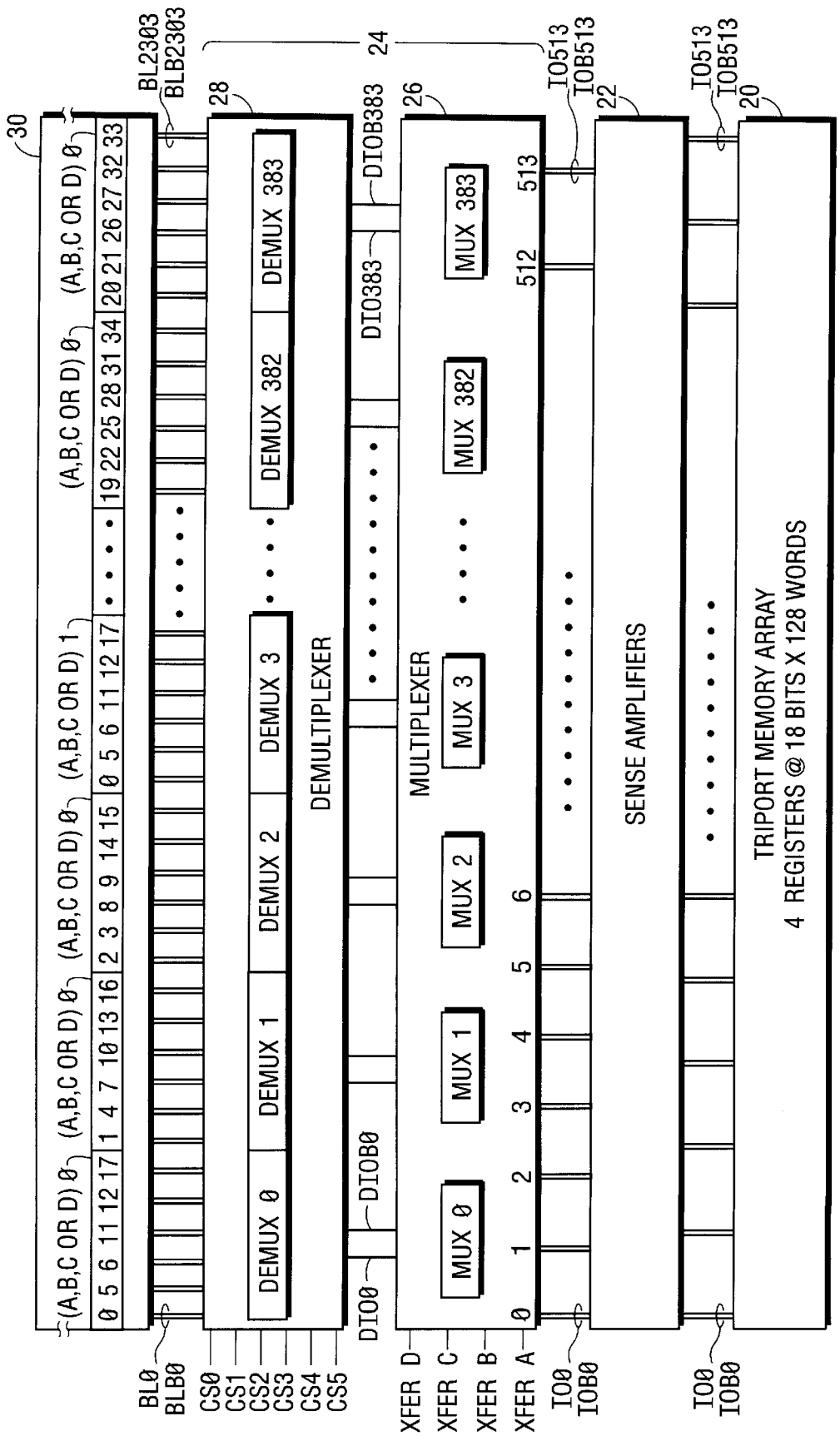
FIG. 4A is a schematic of the preferred steering circuitry of FIG. 1.

Referring now to FIG. 4A, a top-level electrical schematic of the preferred steering circuitry of FIG. 1 is provided. As will become evident from the following description, the steering circuitry 24 enables the highly efficient parallel/serial transfer of multiple bits of data from each column of tri-port cells in a register thereof to a row(s) of memory cells in the supplemental memory array 30 during a respective portion of a write-to-memory time interval and vice versa during a respective portion of a read-from-memory time interval. Using this steering circuitry 24, it is possible to obtain parallel/serial transfer of data from all 18 cells within each of the 128 columns in a register in the tri-port memory array 20 to the supplemental memory array 30 and vice versa in only six sequential steps with reduced layout wiring penalty. This advantage may be achieved even if the columns of tri-port cells in the registers are aligned in a generally orthogonal direction relative to a row of memory cells in the supplemental memory array 30.

Referring now to FIG. 4A, a top-level electrical schematic of the preferred steering circuitry of FIG. 1 is provided. As will become evident from the following description, the steering circuitry 24 enables the highly efficient parallel/serial transfer of multiple bits of data from each column of tri-port cells in a register thereof to a row(s) of memory cells in the supplemental memory array 30 during a respective portion of a write-to-memory time interval and vice versa during a respective portion of a read-from-memory time interval. Using this steering circuitry 24, it is possible to obtain parallel/serial transfer of data from all 18 cells within each of the 128 columns in a register in the tri-port memory array 20 to the supplemental memory array 30 and vice versa in only six sequential steps with reduced layout wiring penalty. This advantage may be achieved even if the columns of tri-port cells in the registers are aligned in a generally orthogonal direction relative to a row of memory cells in the supplemental memory array 30.

Figure 4B:
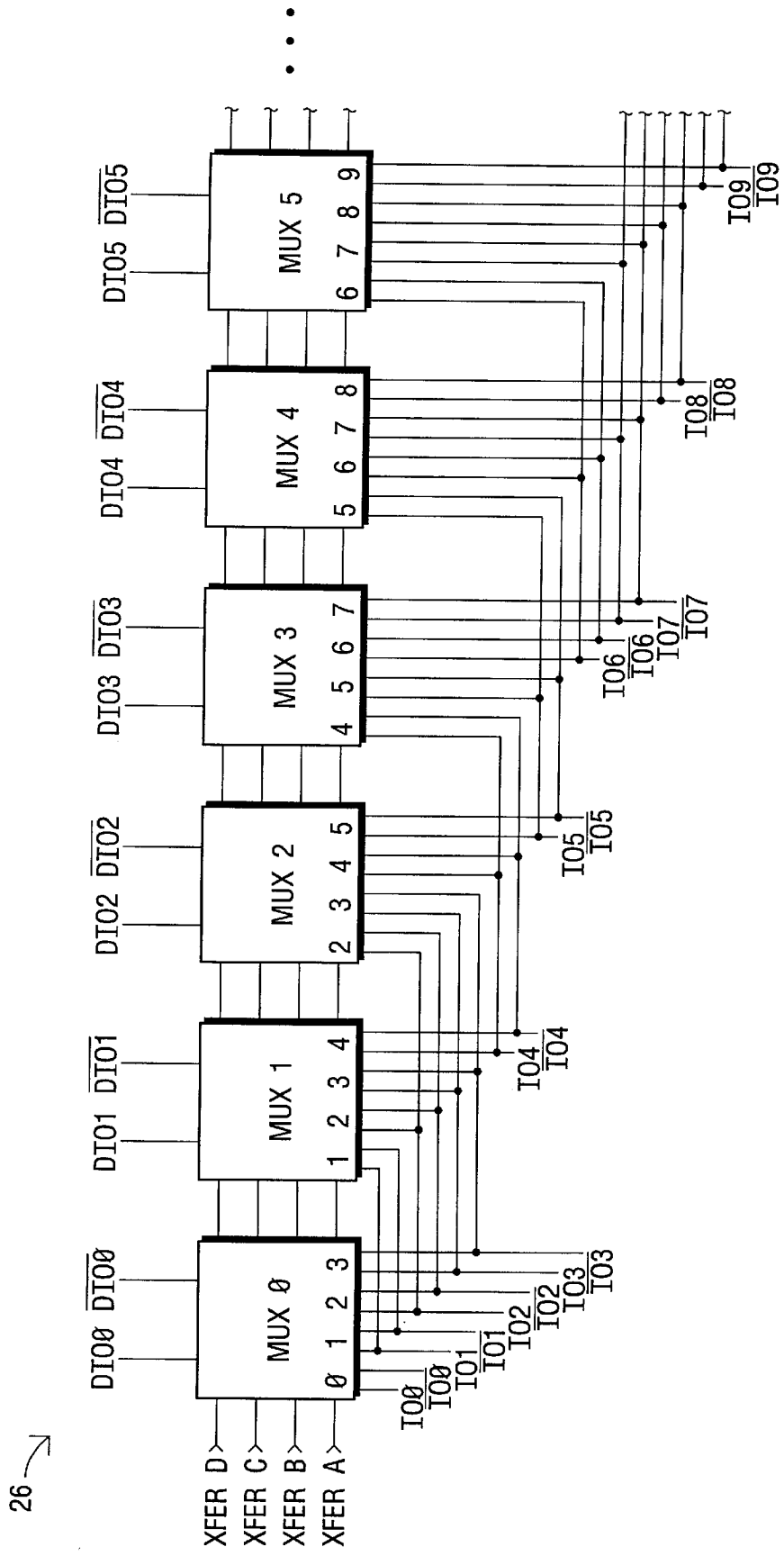
FIG. 4B is a block electrical schematic of the multiplexer circuit of FIG. 4A.
Figure 4C:
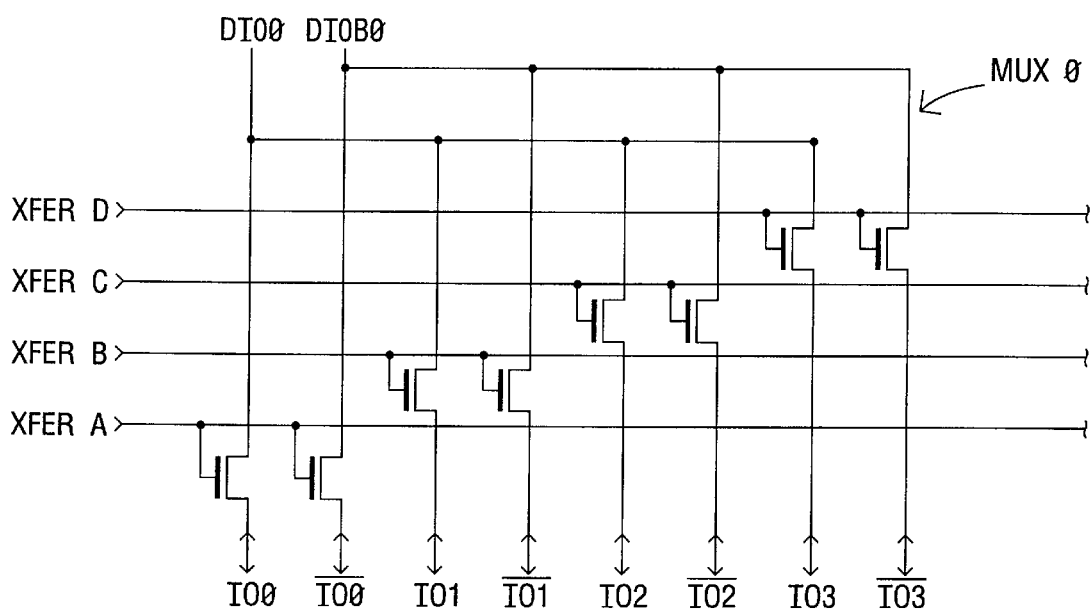
FIG. 4C is an electrical schematic of a multiplexer of FIG. 4B.
Figure 4D:
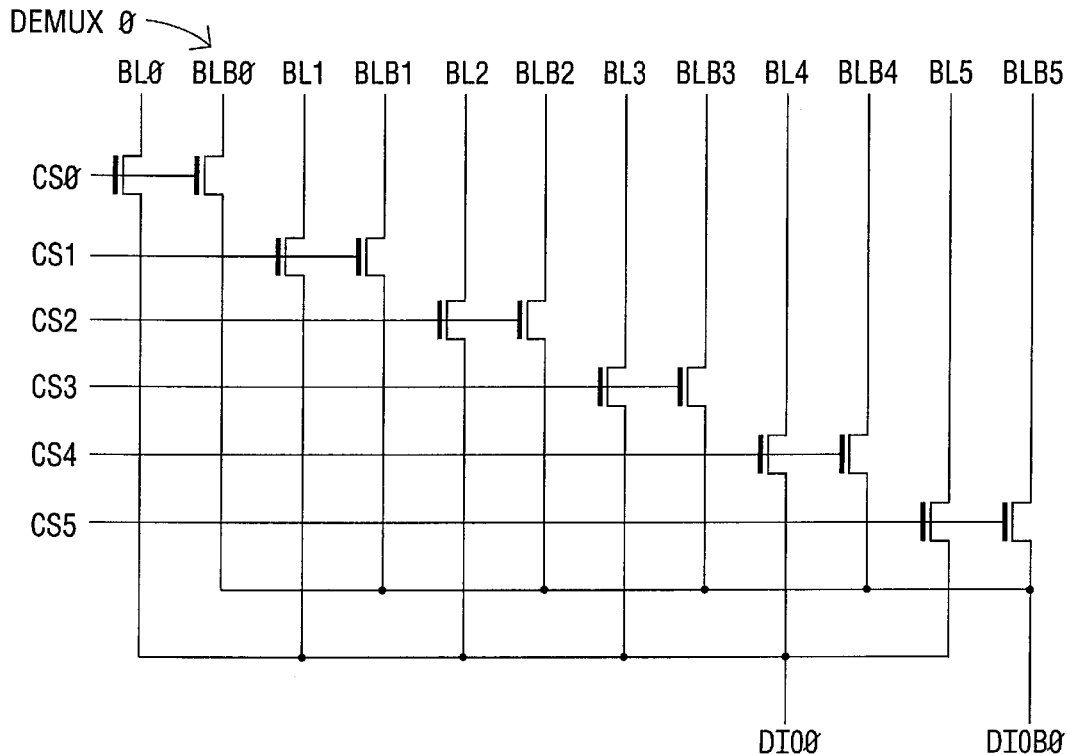
FIG. 4D is an electrical schematic of a demultiplexer of FIG. 4A.

In particular, the steering circuitry 24 of FIG. 4A includes an array 26 of 4-input multiplexers (MUX0–MUX383) which are responsive to a plurality of register transfer signals XFERA, XFERB, XFERC and XFERD. A portion of this array 26 is also illustrated by FIG. 4B. Referring now to FIGS. 4B–4C, each MUX comprises four (4) pairs of pass transistors which electrically couple one of four pairs of input/output lines (e.g., (IO0, IOB0), (IO1, IOB1), (IO2, IOB2) and (IO3, IOB3)) to a single pair of data input/output lines (DIO0, DIOB0). The gate electrodes of each pair of pass transistors are also responsive to application of a respective register transfer signal thereto. Thus, the register transfer signals XFERA-XFERD can be used to selectively couple each pair of input/output lines to the data input/output lines (DIO0, DIOB0). With respect to the first column A0 of register A, if XFERA is asserted, input/output line pairs (IO0, IOB0), (IO1, IOB1) and (IO2, IOB2) are routed to the first three data input/output line pairs (DIO0, DIOB0), (DIO1, DIOB1) and (DIO2, DIOB2). Similarly, with respect to the first column B0 of register B, if XFERB is asserted, input/output line pairs (IO1, IOB1), (IO2, IOB2) and (IO3, IOB3) are routed to the first three data input/output line pairs. With respect to the first column C0 of register C, if XFERC is asserted, input/output line pairs (IO2,IOB2), (IO3, IOB3) and (IO4, IOB4) are routed to the first three data input/output line pairs. Finally, with respect to the first column D0 of register D, if XFERD is asserted, input/output line pairs (IO3, IOB3), (IO4, IOB4) and (IO5, IOB5) are routed to the first three data input/output line pairs. Note, again, that as described with respect to FIG. 3, data inpuvoutput lines DIO0 and DIOB0 transfer data from tri-port cells AO-0, AO-5, AO-6, AO-11, AO-12 and AO-17 upon selection of one of the six transfer signals XFERA0-XFERA5, respectively.

The steering circuitry 24 also includes a plurality of demultiplexers (DEMUX0-DEMUX383) 28 for routing each of the plurality of decoded input/output lines {(DIO0, DIOB0), . . . , (DIO383, DIOB383)} to one of a plurality (e.g., 6) of pairs of adjacent bit lines {(BL0, BLB0), . . . , (BL2303, BLB2303)}. As illustrated best by FIG. 4D, each of these demultiplexers is responsive to six (6) column select signals (CS0–CS5). Thus, during a first portion of a write-to-memory time interval, signals XFERA0, XFERA and CS0 can be simultaneously set to logic 1 values to enable the parallel transfer of data from cells 0–2 in columns A0–A63 on side A and cells 18–20 in columns A63–A0 on side B, to a row of memory cells in the supplemental memory array 30. In particular, these 384 bits of data can be simultaneously loaded into every sixth consecutive cell within the row (e.g., rows 0, 6, 12, 18, . . . ). Next, during a second portion of a write-to-memory time interval, signals XFERA1, XFERA and CS1 can be simultaneously set to logic 1 values to enable the parallel transfer of data from cells 3–5 in columns A0–A63 on side A and cells 21–23 in columns A63–A0 on side B, to the same row (or a different row) of memory cells in the supplemental memory array 30, as illustrated. Accordingly, data from each nonlinear column of tri-port cells in a register can be loaded into a block of adjacent memory cells in the same row in the supplemental memory array 30.

More specifically, the array 26 of 4-input multiplexers (MUX0–MUX383) and array 28 of demultiplexers (DEMUX0–DEMUX383) are arranged so that MUX0–MUX2 and DEMUX0–DEMUX2 control the routing of data between columns A0, B0, C0 or D0 of the tri-port memory array 20 and the first 18 pairs of bit lines BL and BLB (i.e., BL0, BLB0 to BL17 and BLB17). Similarly, multiplexers MUX3–MUX5 and demultiplexers DEMUX3–DEMUX5 control the routing of data between columns A1, B1, C1 or D1 of the tri-port memory array 20 and the second 18 pairs of bit lines BL and BLB and multiplexers MUX6–MUX8 and demultiplexers DEMUX6–DEMUX8 control the routing of data between columns A2, B2, C2 or D2 of the tri-port memory array 20 and the third 18 pairs of bit lines BL and BLB. Here, each of the input/output lines IO and IOB illustrated by FIG. 4B are electrically coupled to three multiplexers (except for those at each end).

As illustrated best by FIGS. 2, 4A and 4B, during a transfer of data from (to) register A in the tri-port memory array 20 to (from) the supplemental memory array 30, the physical location of the data transferred to (from) memory cells in a row of memory in the supplemental memory array 30 is independent of the source (destination) of data (register A, B, C, or D). The sequence of each word of 18 bits stored in a row of the supplemental memory is: (|0,5,6,11,12,17|, |1, 4,7,10,13,16| and |2,3,8,9,14,15|). If XFERA0 and XFERA are set to logic 1 potentials and column select signal CS0 is also set high, the data in cell 0 of column A0 (provided to port 0 of the bidirectional port 21) can be passed through MUX0 and DEMUX0 to bit lines BL0 and BLB0. Similarly and simultaneously, the data in cell 1 of column A0 can be passed through MUX1 and DEMUX1 to bit lines BL6 and BLB6 and the data in cell 2 of column A0 can be passed through MUX2 and DEMUX2 to bit lines BL12 and BLB12. Likewise, if instead XFERA1 and XFERA are set to logic 1 potentials and column select signal CS1 is also set high, the data in cell 5 of column A0 (provided to port 0 of the bidirectional port 21) can be passed through MUX0 and DEMUX0 to bit lines BL1 and BLB1, the data in cell 4 of column A0 can be passed through MUX1 and DEMUX1 to bit lines BL7 and BLB7 and the data in cell 3 of column A0 can be passed through MUX2 and DEMUX2 to bit lines BLI3 and BLB13.

With respect to column A1 of register A, if XFERA0 and XFERA are set to logic 1 potentials and column select signal CS0 is also set high, the data in cell 0 of column A1 (provided to port 4 of the bidirectional port 21) can be passed through MUX3 and DEMUX3 to bit lines BL18 and BLB18, the data in cell 1 of column A1 (provided to port 5 of the bidirectional port 21) can be passed through MUX4 and DEMUX4 to bit lines BL24 and BLB24 and the data in cell 2 of column A1 (provided to port 6 of the bidirectional port 21) can be passed through MUX5 and DEMUX5 to bit lines BL30 and BLB30. Continuing with respect to column A1 of register A, if XFERA1 and XFERA are set to logic 1 potentials and column select signal CS1 is also set high, the data in cell 5 of column A1 (provided to port 4 of the bidirectional port 21) can be passed through MUX3 and DEMUX3 to bit lines BL19 and BLB19, the data in cell 4 of column A1 (provided to port 5 of the bidirectional port 21) can be passed through MUX4 and DEMUX4 to bit lines BL25 and BLB25 and the data in cell 3 of column A1 (provided to port 6 of the bidirectional port 21) can be passed through MUX5 and DEMUX5 to bit lines BL31 and BLB31. Accordingly, on a column-by-column basis, the steering circuitry 24 provides a routing a selected three of four (4) ports to three (3) pairs of data input/output lines to eighteen (18) bit line pairs, this being repeated 128 times.

Figure 5:
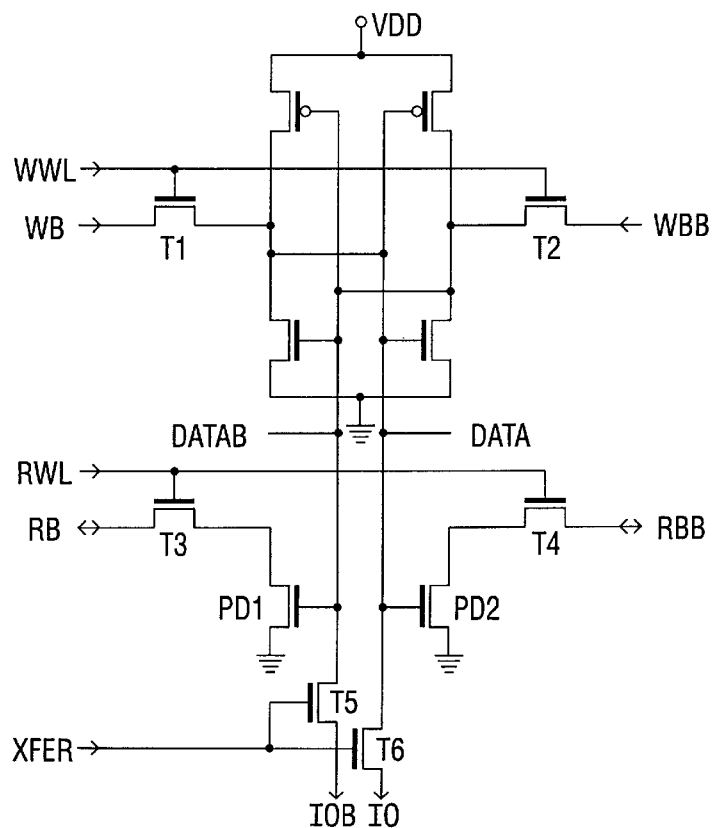
FIG. 5 is an electrical schematic of a tri-port cell of FIG. 3.

Referring now to FIG. 5, a preferred tri-port SRAM cell contains a unidirectional write port formed by complementary data input lines (WB and WBB—horizontal wires in FIG. 3) and enabled by a write word line (WWL—zig zag vertical wire in FIG. 3) and a unidirectional read port formed by complementary data output lines (RB and RBB—horizontal wires in FIG. 3) and enabled by a read word line (RWL—zig zag vertical wire in FIG. 3). A bidirectional input/output port is also provided by complementary lines IO and IOB (vertical wires in FIGS. 1–4, 5A) and enabled by a transfer signal (XFER). The 24 XFER signal lines each run more or less horizontally. In FIGS. 3–4, each of the transfer signal lines electrically connects three cells in every column of a respective register. Write data can be transferred from the complementary data input lines (one at Vss and one at Vdd) to the tri-port SRAM cell by applying a logic 1 potential to the write word line WWL which is electrically coupled to the gate electrodes of two write pass transistors T1 and T2. Cell data can also be read independently and simultaneously on complementary data lines by applying a logic 1 potential to the read word line RWL which is electrically coupled to the gate electrodes of two read pass transistors T3 and T4. The reading operation can be performed without affecting cell voltage levels by eliminating a direct electrical connection between lines RB and RBB and internal nodes DATAB and DATA, respectively. In particular, the values of the voltages at internal nodes DATAB and DATA can be determined by sensing the "on" or "off" condition of pull down transistors PD1 and PD2 once a logic 1 potential is applied to the read word line RWL. In this manner, the read and write ports perform as the separate read and write ports of a conventional dual-port SRAM cell. The internally stored data can also be provided out to the bidirectional inpuvoutput port (lines IO and IOB) by driving the transfer signal (XFER) to a logic 1 potential to turn on pass transistors T5 and T6. Here, lines IO and IOB are initially equilibrated to a high voltage, preferably Vdd. Then, either line IOB or line IO is brought to a somewhat lower potential through T5 or T6 depending on whether DATAB or DATA is at a logic 0 potential. The difference in potential between line IO and IOB is then sensed by a sense amplifier, such as the sense amplifier 22 in FIG. 1. To write data from the supplemental memory array 30 into a tri-port SRAM cell, lines IO and IOB at the bidirectional input/output port are set to complementary logic values (Vdd and Vss) and then the transfer signal XFER is set to a logic 1 potential to turn on pass transistors T5 and T6. In this manner, the bidirectional input/output port performs the same functions as a combined read port and write port of a conventional SRAM cell.

Referring now to FIGS. 6–10, preferred methods of controlling memory buffers having tri-port memory arrays therein will be described. As described above with reference to FIGS. 1–5, the tri-port memory array 20 acts as a cache memory array containing data not yet in the supplemental memory array 30 and/or a subset of data contained in the supplemental memory array 30. The tri-port memory array 20 contains a plurality of registers of multi-port memory cells and the DRAM array acts as a supplemental memory array 30 of much greater capacity. In particular, to enable the buffer memory device 10 to have the most preferred features of current state-of-the-art dual-port sequential buffer memory devices (e.g., FIFO, LIFO), preferred methods of operating the sequential memory device include the steps of reading data from a current tri-port register (e.g., register A) in the cache memory array to a peripheral device, writing data from a peripheral device to a current write register (e.g., register B) and also performing read and write arbitration to always make a next-to-write register (e.g., register C) and a next-to-read register (e.g., register D) available in the cache memory array. As described above, the use of four separate registers in the cache memory array, efficient steering circuitry and preferred tri-port controller logic eliminates the possibility that gaps or stoppages will occur in the flow of data into and out of the buffer memory device during read and write operations.

Figure 9:
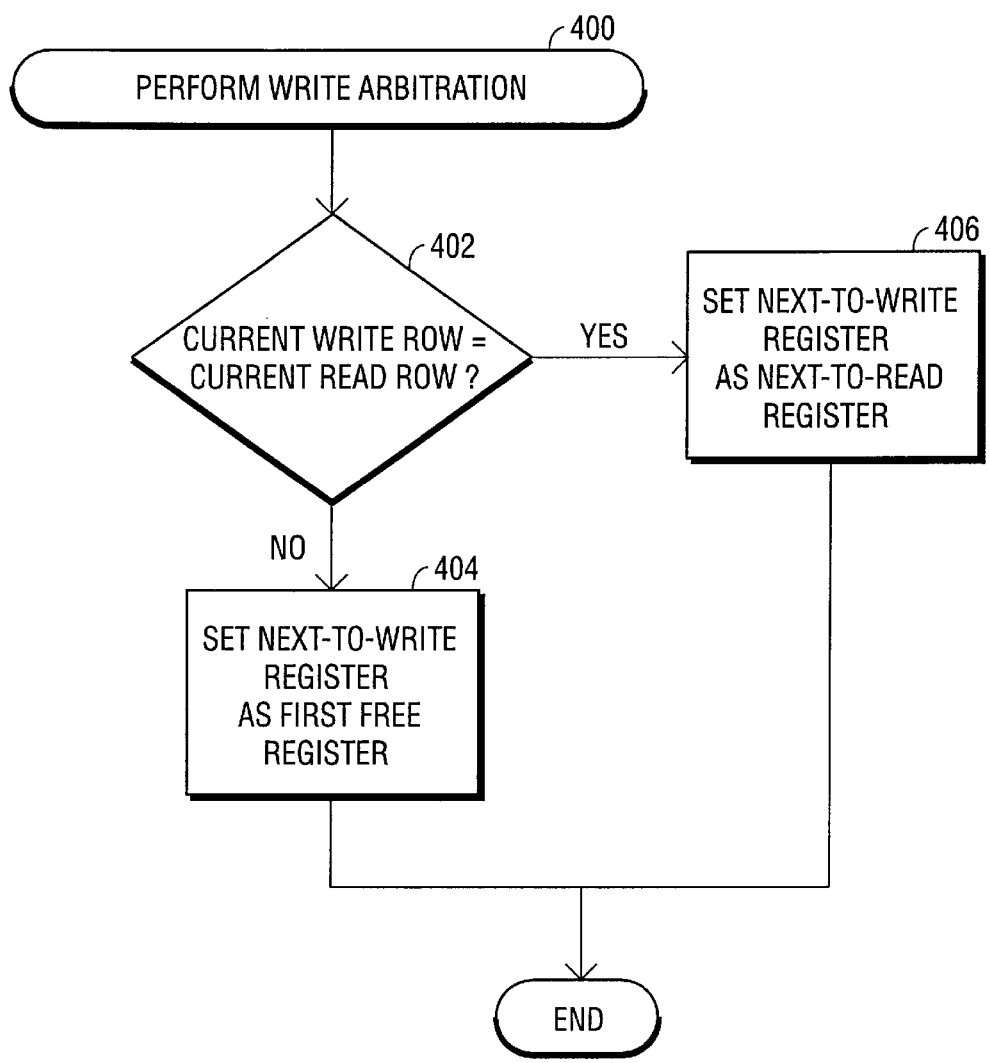
FIG. 9 is a flow diagram illustrating write arbitration operations performed by the buffer memory device of FIG. 1.

As best illustrated by FIG. 9, the operations 400 for performing write arbitration include determining a next-to-write register as a first free register in the cache memory array if the current read and write registers are different registers, Blocks 402 and 404, or as the next-to-read register if the current read and write registers are the same register, Blocks 402 and 406. Here, the operations for determining whether the current read and write registers are the same or different at Block 402 are preferably performed by comparing whether the values of the current read register pointer 17a and current write register pointer 19a of FIG. 1 are the same. Alternatively, the values of the read row and write row pointers 25 and 23, respectively, may be compared to determine whether the current read and write registers are the same or different. For example, the read row pointer 25 may be preferably configured to provide a first pointer to the row in supplemental memory 30 containing data in the current read register and a second pointer to the row containing next-to-read data relative to the data in the current read register. Thus, a direct comparison of equivalency between the value of the first pointer and the value of the write row pointer could be made. However, because a comparison of the read and write row pointers may be more computationally complex (e.g., requiring an 11-bit comparison) than a comparison of the values of the current read and current write register pointers (e.g., requiring a 4-bit comparison if each register is assigned one bit entry within a four-bit register), a comparison of the current read and write register pointers is preferred.

Figure 10:
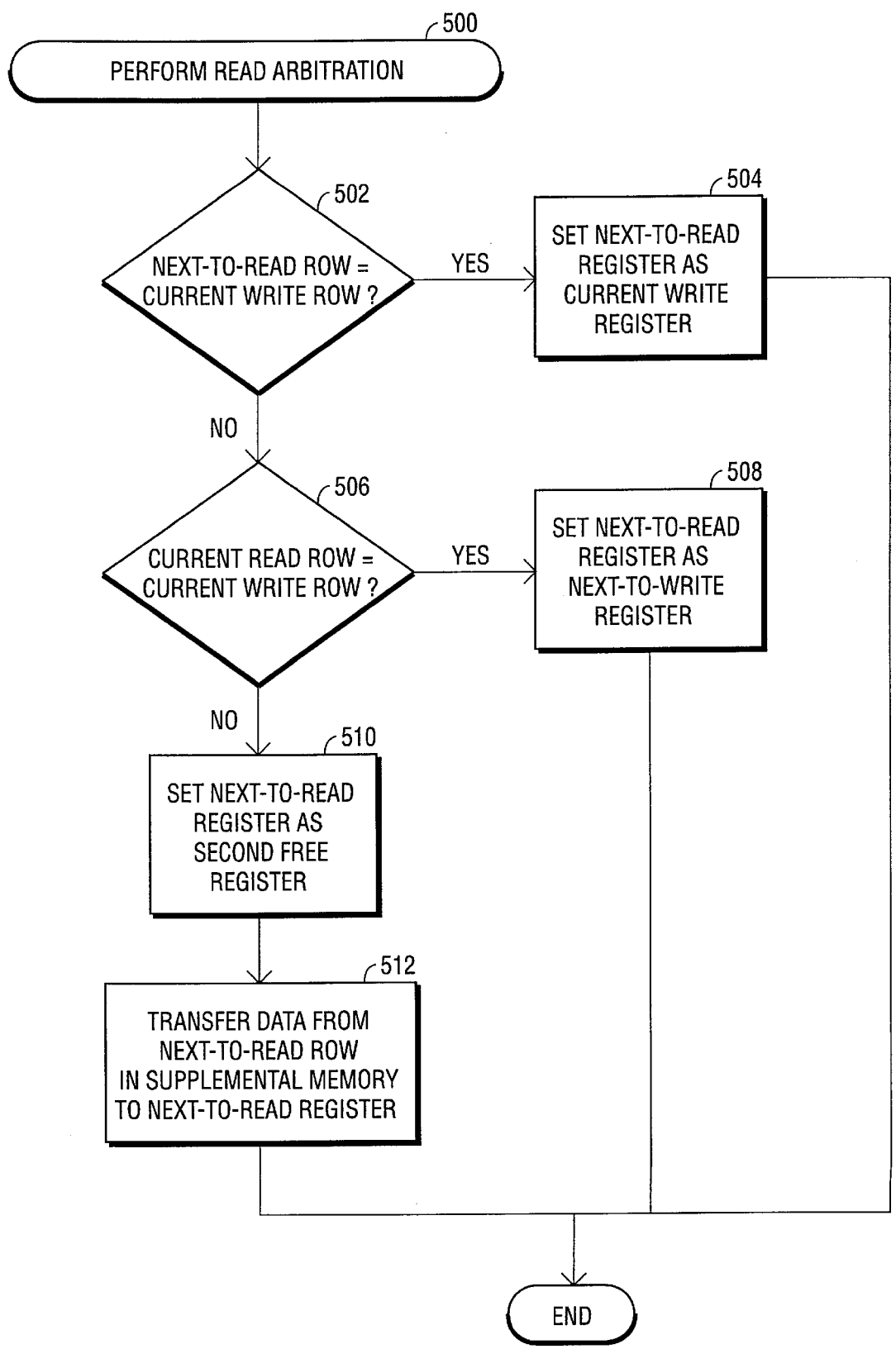
FIG. 10 is a flow diagram illustrating read arbitration operations performed by the buffer memory device of FIG. 1.

As illustrated best by FIG. 10, the operations 500 for performing read arbitration include determining a next-to-read register as the current write register if the current write register contains next-to-read data relative to data in the current read register, Blocks 502 and 504. Read arbitration operations also include determining the next-to-read register as a second free register in the cache memory array 20 if the current read and write registers are different registers and the next-to-read register is not the current write register, Blocks 502, 506 and 510, or as the next-to-write register if the current read and write registers are the same register, Blocks 502, 506 and 508. According to a preferred aspect of the read arbitration operations 500, the operations for determining the next-to-read register as the second free register are closely followed by the step of transferring next-to-read data relative to the data in the current read register from the supplemental memory array 30 to the second free register, Blocks 502, 506, 510 and 512, via the steering circuitry of FIG. 1. As with the write arbitration operations 400, the operations for determining whether the next-to-read register and the current write register are the same or different at Block 502 may be performed by comparing the values of the read row pointer 25 and write row pointer 23 to determine if they point to the same row in the supplemental memory 30. However, the operation for determining whether the current read register and current write register are the same or different at Block 506, is preferably similar to the operation described with respect to Block 402 of FIG. 9. In other words, a comparison of the current read register pointer 17a and current write register pointer 19a may be performed.

Figure 6:
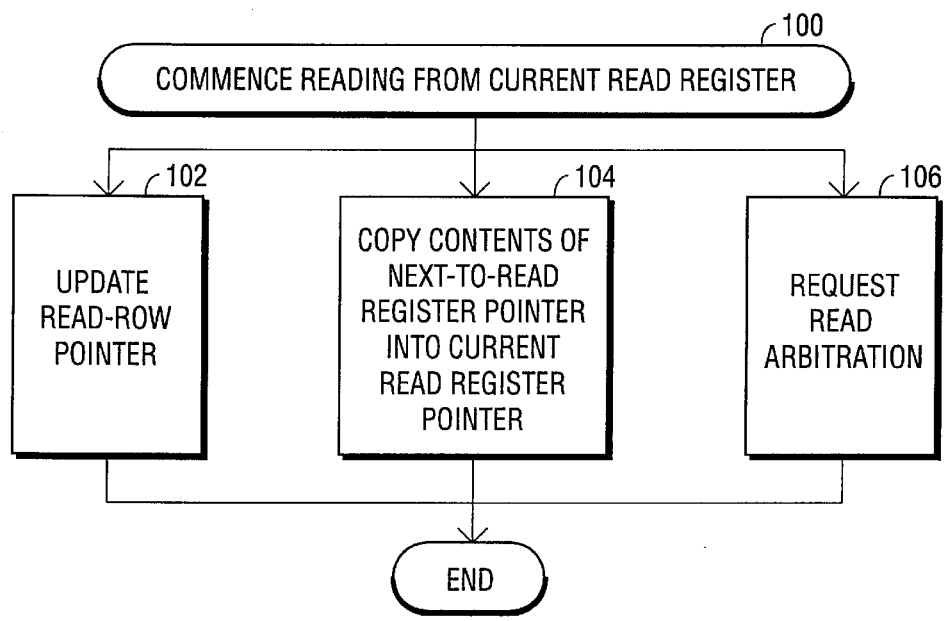
FIG. 6 is a flow diagram illustrating operations performed by the buffer memory device of FIG. 1 when reading tri-port register data from a current read register in a tri-port memory array.
Figure 7:
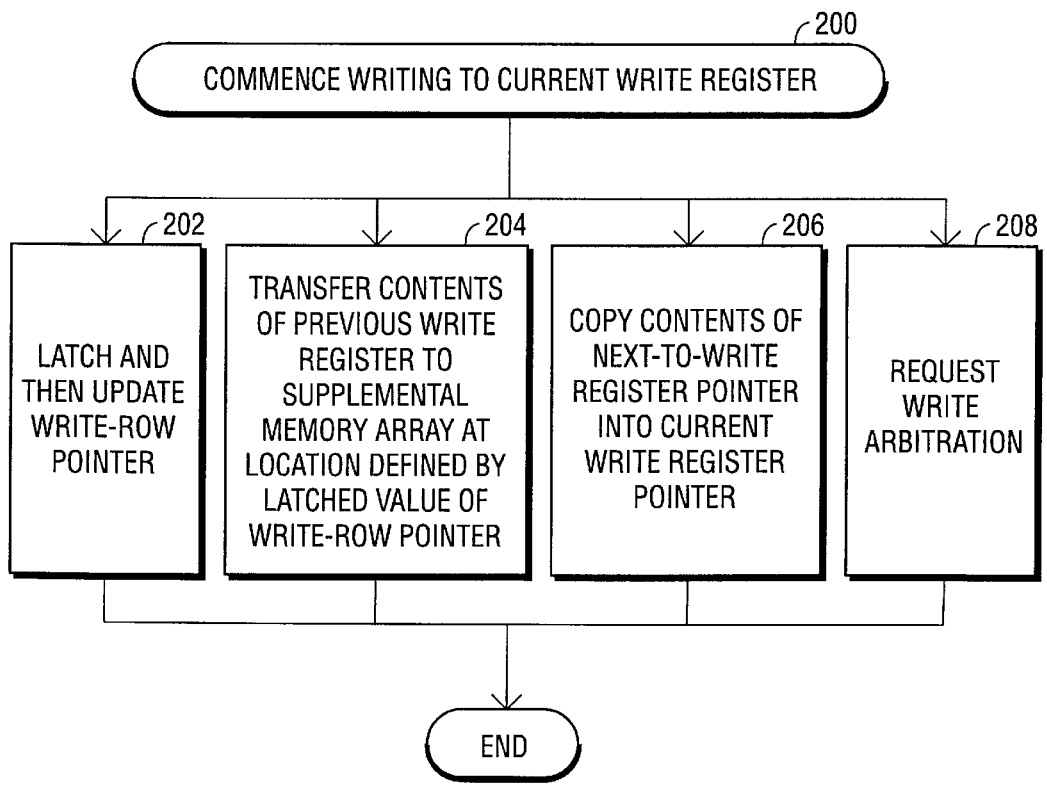
FIG. 7 is a flow diagram illustrating operations performed by the buffer memory device of FIG. I when writing data into a current tri-port register in a tri-port memory array.

Here, the operations for performing read arbitration are preferably preceded by an operation to update the read row pointer 25, as described more fully hereinbelow with respect to FIG. 6., so that an updated value of the read row pointer/counter 25 can be used for comparison with the write row pointer/counter 23. For example, an operation can be performed during read arbitration to compare the value of the read row pointer 25 (which preferably points to a row in the supplemental memory containing next-to-read data relative to the data in the current read register) with the value of the write row pointer 23, and then assign one of the four registers in the cache memory array as the next-to-read register based on the outcome of the comparison. This assigned next-to-read register then receives next-to-read data relative to the data in the current read register, as illustrated by Block 512 in FIG. 10. Here, the write row pointer 23 is preferably controlled to point to a current write row in the supplemental memory array 30 which is to receive data from the current write register once the current write register has been filled. Then, during performance of the read arbitration operation 500, the next-to-read register is determined as the current write register if the read row pointer 25 points to the current write row when the step of comparing the values of the pointers is performed, Blocks 502 and 504. The next-to-read register is also determined as the next-to-write register at Blocks 506 and 508. if the current read row is the same as the current write row because the current read register pointer 17a and the current write register pointer 19a contain the same value. Alternatively, although less preferred, the read row pointer 25 may also provide a pointer to the current read row (which is typically one row below the next-to-read row in the supplemental memory array 30) and this pointer may be directly compared (e.g., as an 11-bit operand) with the value of the write row pointer 23.

Referring again to FIG. 6, preferred operations 100 are also performed upon commencement of the steps of reading data from a current read register. These operations 100 include the operation of updating the read row pointer 25 to point to a row of data in the supplemental memory 30 which contains next-to-read data relative to the data in the current read register, Block 102, and the operation of copying the contents of the next-to-read register pointer 17b into the current read register pointer 17a, Block 104, so that the register now being read from is properly defined for performance of read arbitration. At about the time the operations of Blocks 102 and 104 are performed, or shortly thereafter, a request for read arbitration, Block 106, is generated. Similarly, referring now to FIG. 7, preferred operations 200 are also performed upon commencement of the steps of writing data to a current write register. These operations include the operations of latching and then updating the value of the current write row pointer/counter 23, Block 202, and transferring the contents of the tri-port register previously written to, to a row in the supplemental memory array 30 which is defined by the latched value of the write row pointer/counter 23, Block 204. Similar to the operation illustrated by Block 104 of FIG. 6, an operation is also performed to copy the contents of the next-to-write register pointer 19b into the current write register pointer 19a, Block 206, so that the register currently being written to is properly defined for write arbitration. At about the time the operations of Blocks 202, 204 and 206 are performed, or shortly thereafter, a request for write arbitration, Block 208, is generated. The operations illustrated by FIGS. 6–7, however, need not be initially performed after a master reset operation.

Figure 8:
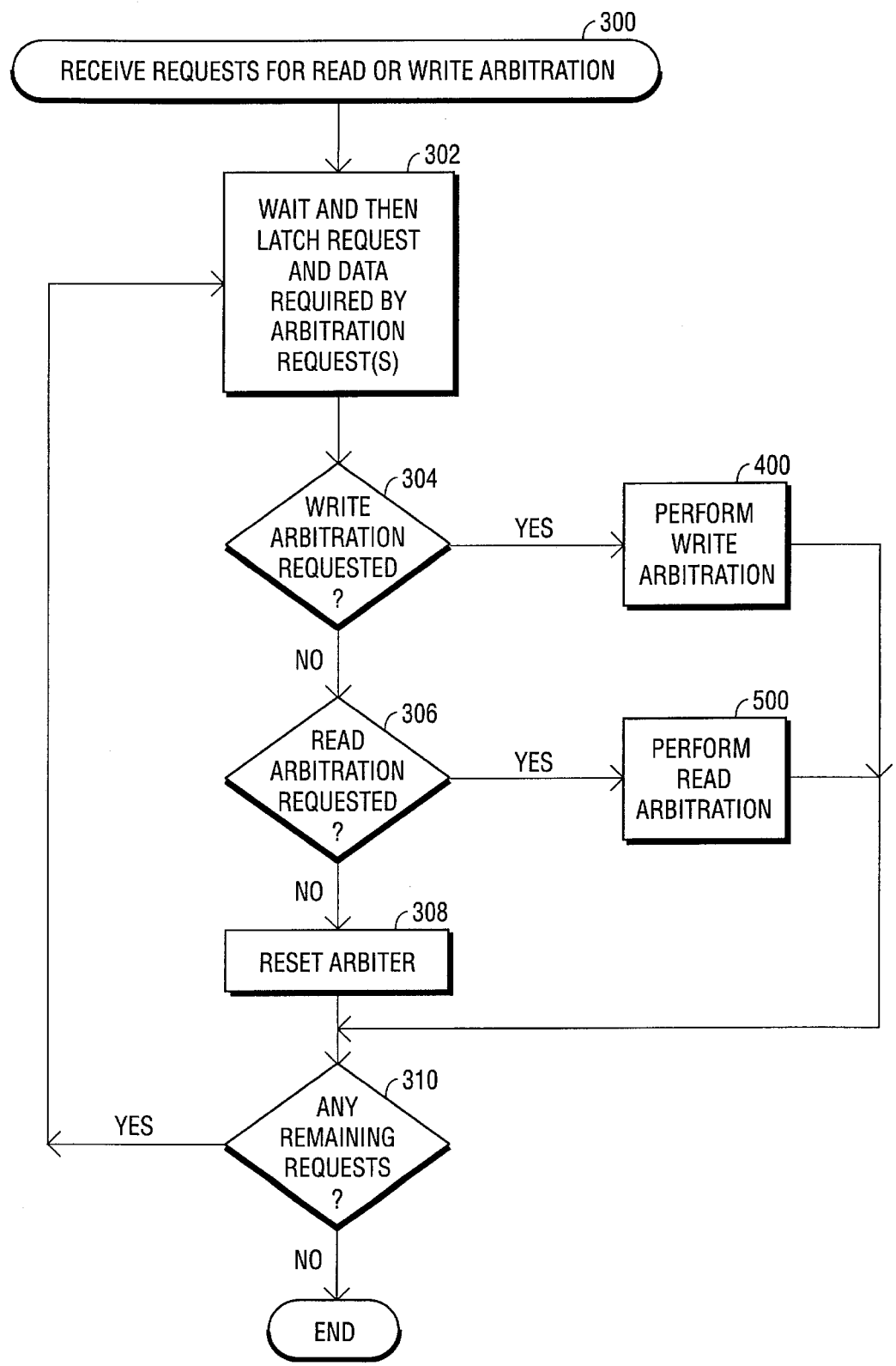
FIG. 8 is a flow diagram illustrating operations performed by the buffer memory device of FIG. 1 upon receipt of read and/or write arbitration requests.

Referring now to FIG. 8, additional operations 300 performed under control of the processor and tri-port control logic 15 upon receipt of a read and/or write arbitration request, are illustrated. Here, an initial operation is performed to latch the requests and latch data that will be required upon performance of the read and write arbitration operations, Block 302. Checks are then made at Blocks 304 and 306 to determine whether a read or write arbitration request has been made, and then initiate performance of the arbitration at Blocks 400 and 500. The arbiter is also reset after performance of the requested arbitrations, Block 308. As illustrated by Block 310, multiple read and write arbitration requests may also be handled.

A summary of the above-described operations will now be provided with respect to a particular embodiment of the present invention: a first-in first-out (FIFO) buffer memory device. In particular, operation of the preferred FIFO begins with a master reset operation. This operation performs a number of functions, including initialization of the write register pointers 19a, 19b to a current register and next-to-write register in the tri-port memory array 20. The current write register may be arbitrarily selected as register A, for example, and the next-to-write register may arbitrarily be selected as register B. The write column counter 11 may be initialized to a specific count (e.g., count 0). The read register pointers 17a, 17b will also be initialized to point to the same registers as the write register pointers 19a, 19b, and the read column counter 13 will be initialized to the specific count (e.g., count 0). Thus, reading and writing operations may commence from the same starting location in the same register.

Based on the preferred construction of the tri-port memory array 20, data initially written into column 0 of register A is immediately available for reading since the write and read column counters (and register pointers) address the same location. This provides the very fast fall-through speed of the preferred FIFO. Columns 1–63 of register A can also be written to during consecutive write clock cycles as the write column counter 11 is incremented. This data, like the data initially written into column 0, is also immediately available for reading as the read column counter 13 is incremented with each consecutive read clock cycle. If the preferred FIFO is configured as a 36-bit part, columns 0 and 127 of register A may be simultaneously selected for writing by the write column counter 11. Here, the 18-bit LSB and 18-bit MSB portions of each 36-bit word may be simultaneously written into designated columns on side A and side B of the tri-port memory array 20. During the next write clock cycles, columns 1 and 126 of register A may be simultaneously written to, and then columns 2 and 125 may be simultaneously written to, and so on until the two central most columns have been written. Alternatively, columns 0 and 64 of a selected register may be written to during a first write clock cycle, and then columns 1 and 65 may be written to during a second write clock cycle. This sequence may continue until central column 63 and right side column 127 have been filled.

If, for purposes of illustration, many write cycles occur before any read cycles, register A may become full. In particular, after 64 write cycles, register A will be filled and then subsequent writing will be directed to register B. Once register B has been filled, writing will commence in register C, for example, and then in register D. Again, as stated above, the selection of registers C and D is not predetermined, but is based on the sequence of arbitration operations performed by the processor and control logic 15 and the particular order of write and read cycles. Once register D has been filled, spaced in the tri-port memory array 20 must be made available for additional write data since, in the preferred embodiment, there is no fifth register.

The data in register A cannot be disturbed because it contains the next data to be read upon selection by the read column counter 13 and this read data must be immediately available. Similarly, the data in register B cannot be disturbed because a number of read cycles, perhaps 63 read cycles, may have occurred since master reset and therefore, the contents of register B may soon be required. However, if the current read register pointer 17a still points to register A, the contents of register C will not be required for reading for at least 640 nanoseconds (64 read cycles at 10 ns/cycle) as register B is read. Therefore, shortly after register C has been filled and assuming the current read register pointer 17a is still pointing to register A (i.e., the current read register pointer 17a is still at least one register removed from the data in register C), the contents of register C can be transferred to a row of memory cells in the supplemental memory array 30 (for later recall once the current read register pointer 17a is updated to point to register B). This transfer operation (which typically takes 200 ns) must be completed in 640 ns to make room for additional write data to follow the current write data in register D. Moreover, as additional data is written to the tri-port memory array 20 (still without any significant reading), the write data will alternately fill register C, then D, then C, then D and so on. After each of these registers has been filled, its contents are transferred to a sequence of rows of the supplemental memory 30 defined by the write row pointer 23. For example only, the first data written into register C may be transferred to row 0 of the supplemental memory 30 and the first data written into register D may be transferred to row 1. The next write data to fill register C in the sequence is then transferred to row 2 and the next write data to fill register D is transferred to row 3, and so on.

According to a preferred aspect of the present invention, the transfer of data from a register in the tri-port memory array to a row of memory cells (preferably a single row) in the supplemental memory array 30 (using six (6) consecutive transfer operations) takes less than about 200 nanoseconds, as does a transfer from the supplemental memory array 30 to a register in the tri-port memory array 20. Thus, during the 640 nanoseconds (at maximum operating frequency) required to fill or empty a register during write or read operations, there is sufficient time to do at least three supplemental memory operations requiring 200 ns each, for example. Thus, during 640 ns (the duration of the minimum "write-to-register" time interval or the duration of the minimum "read-from-register" time interval), there is sufficient time to perform one write-to-memory transfer operation, one read-from-memory transfer operation and, if necessary, one refresh operation in the event the supplemental memory array 30 is comprised of DRAM memory cells. Accordingly, the contents of a register just written to can be transferred to the supplemental memory array 30 and the contents of the next register to be read can be transferred back into the same or another register in the tri-port memory array 20 to allow continuous writing and reading. This makes the register whose data was just transferred seamlessly available as the next read data. Thus, with four (4) registers, there can be, if necessary, a register currently being read, a register with the next data to be read (this data available before all data in the current read register has been read), a register currently being written to (this register may be the same as the current read register if the FIFO is almost empty) and a register that has been filled with write data and whose data is being transferred to the supplemental memory array 30.

The preceding discussion gives some additional insights into the present invention which utilizes four (4) tri-port registers and a supplemental memory to achieve the fall-through characteristics of a dual-port based FIFO with the total capacity of a large DRAM. It further gives a possible sequence of choosing registers during a single, very specific order of writing (perhaps thousands of words) before doing any reading. But, correct operation is required for any sequence of writing and reading, as long as the capacity of supplemental memory is not exceeded. Here, the processor and control logic 15 chooses which register is selected to read next and which register is selected to write next under all possible write/read circumstances.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. In a memory device containing a cache memory array, arranged as a plurality of registers of multiport memory cells, and a supplemental memory array, a method of operating the memory device as a first-in first-out memory buffer having a capacity greater than a capacity of the cache memory array, said method comprising the steps of;

reading data from a current read register in the cache memory array;

writing data to a current write register in the cache memory array;

performing write arbitration to determine a next-to-write register as a first free register in the cache memory array if the current read and write registers are different registers; and performing read arbitration to determine a next-to-read register as the current write register if the current write register contains next-to-read data relative to data in the current read register, or as a second free register in the cache memory array if the current read and write registers are different registers and the next-to-read register is not the current write register.

2. The method of claim 1, wherein said step of performing read arbitration comprises determining the next-to-read register as the next-to-write register if the current read and write registers are the same register.

3. The method of claim 1, wherein said step of determining a next-to-read register as the second free register is followed by the step of transferring next-to-read data relative to the data in the current read register from the supplemental memory array to the second free register.

4. The method of claim 1, wherein the memory device contains read row and write row pointers which point to respective rows in the supplemental memory array; and wherein said step of performing read arbitration is preceded by the step of updating the read row pointer.

5. The method of claim 4, wherein said step of performing read arbitration comprises comparing the read row and write row pointers.

6. The method of claim 5, wherein the write row pointer points to a current write row in the supplemental memory array which is allocated to receive data from the current write register; and wherein said step of performing read arbitration comprises determining the next-to-read register as the current write register if the read row pointer points to the current write row when said step of comparing the read row and write row pointers is performed.

7. The method of claim 2, wherein the memory device contains a current read register pointer which points to the current read register and a current write register pointer which points to the current write register; and wherein said step of performing read arbitration comprises comparing the current read register pointer to the current write register pointer to determine whether the next-to-read register should be assigned as the next-to write register.

8. The method of claim 6, wherein the memory device contains a current read register pointer which points to the current read register and a current write register pointer which points to the current write register; and wherein said step of performing read arbitration comprises comparing the current read register pointer to the current write register pointer to determine whether the next-to-read register should be assigned as the next-to write register.

9. The method of claim 8, wherein said step of performing write arbitration comprises comparing the current read register pointer to the current write register pointer to determine whether the next4o-write register should be assigned as the next-to-read register.

10. The method of claim 1, further comprising the step of transferring data from the supplemental memory array to the next-to-read register in the cache memory array, after said step of determining the second free register as the next-to-read register is performed.

11. The method of claim 10, wherein the cache memory array comprises a plurality of registers of tri-port memory cells; wherein each of the registers of tri-port memory cells is arranged as a plurality of nonlinear columns of tri-port memory cells; and wherein a capacity of each of the registers of tri-port memory cells equals a capacity of a row of memory cells in the supplemental memory array.

12. The method of claim 10, wherein the memory device further comprises a crosspoint switch electrically coupled between the cache memory array and the supplemental memory array; and wherein said step of transferring data from the supplemental memory array to the next-to-read register in the cache memory array comprises transferring data through the crosspoint switch to each of the nonlinear columns of tri-port memory cells in the next-to-read register.

13. The method of claim 1, wherein the memory device contains a read row pointer which points to a row in the supplemental memory; and wherein said step of reading data from a current read register comprises updating the read row pointer to point to a row in the supplemental memory array that contains data to be loaded into the next-to-read register during said step of performing read arbitration.

14. The method of claim 13, wherein the memory device contains a current read register pointer which defines the current read register and a next-to-read register pointer which defines the next-to-read register; and wherein said step of reading data from a current read register comprises copying contents of the next-to-read register pointer into the current read register pointer.

15. The method of claim 14, wherein said step of reading data from a current read register comprises generating a request to commence said step of performing read arbitration.

16. The method of claim 1, wherein said step of reading data from a current read register comprises generating a request to commence said step of performing read arbitration.

17. The method of claim 2, wherein the memory device contains a read row pointer which points to a row in the supplemental memory; and wherein said step of reading data from a current read register comprises updating the read row pointer to point to a row in the supplemental memory array that contains data to be loaded into the next-to-read register during said step of performing read arbitration.

18. The method of claim 17, wherein the memory device contains a current read register pointer which defines the current read register and a next-to-read register pointer which defines the next-to-read register; and wherein said step of reading data from a current read register comprises copying contents of the next-to-read register pointer into the current read register pointer.

19. The method of claim 18, wherein said step of reading data from a current read register comprises generating a request to commence said step of performing read arbitration.

20. The method of claim 1, wherein the memory device contains a write row pointer which points to a row in the supplemental memory; and wherein said step of writing data to a current write register comprises latching the value of the write row pointer and then updating the write row pointer to point to a row in the supplemental memory array that is allocated to receive data in the current write register.

21. The method of claim 20, wherein said step of writing data to a current write register comprises transferring data from the cache memory array to a row in the supplemental memory array corresponding to the latched value of the write row pointer.

22. The method of claim 21, wherein said step of writing data to a current write register comprises generating a request to commence said step of performing write arbitration.

23. The method of claim 2, wherein the memory device contains a write row pointer which points to a row in the supplemental memory; and wherein said step of writing data to a current write register comprises latching the value of the write row pointer and then updating the write row pointer to point to a row in the supplemental memory array that is allocated to receive data in the current write register.

24. The method of claim 23, wherein said step of writing data to a current write register comprises transferring data from the cache memory array to a row in the supplemental memory array corresponding to the latched value of the write row pointer.

25. The method of claim 24, wherein said step of writing data to a current write register comprises generating a request to commence said step of performing write arbitration.

26. The method of claim 25, wherein the memory device contains a write read register pointer which defines the current write register and a next-to-write register pointer which defines the next-to-write register; and wherein said step of writing data to a current write register comprises copying contents of the next-to-write register pointer into the current write register pointer.

27. In a memory device containing a cache memory array arranged as four registers of tri-port memory cells, a supplemental memory array and a crosspoint switch electrically coupled between the supplemental memory array and the cache memory array, a method of operating the memory device as a first-in first-out memory buffer having a capacity greater than a capacity of the cache memory array, said method comprising the steps of:

reading data from a current read register in the cache memory array while simultaneously transferring next-to-read data relative to the data in the current read register from the supplemental memory array to a first free register in the cache memory array;

writing data to a current write register in the cache memory array;

performing write arbitration by determining a next-to-write register as a second free register in the cache memory array if the current read and write registers are different registers; and performing read arbitration by determining a next-to-read register as the current write register if the current write register contains next-to-read data relative to data in the current read register, and as the first free register in the cache memory array if the current mad and write registers are different registers and the next-to-read register is not the current write register.

28. The method of claim 27, wherein said writing step comprises the step of writing data to a current write register in the cache memory array while simultaneously transferring data from the cache memory array to the supplemental memory array.

29. The method of claim 27, wherein said step of performing read arbitration comprises determining the next-to-read register as the next-to-write register if the current read and write registers are the same register.

30. The method of claim 27, wherein said step of transferring next-to-read data comprises transferring first data in parallel from a first row of memory cells in the supplemental memory array to the first free register during a first portion of a read-from-memory time interval and then transferring second data in parallel from the first row of memory cells in the supplemental memory array to the first free register during a second portion of the read-from-memory time interval.

31. The method of claim 30, wherein said steps of transferring first and second data comprise transferring first and second data through the crosspoint switch during non-overlapping time intervals.

32. The method of claim 27, wherein the memory device contains read row and write row pointers which point to respective rows in the supplemental memory array; wherein said step of performing read arbitration is preceded by the step of updating the read row pointer; and wherein said step of performing read arbitration comprises comparing the values of the read and write row pointers.

33. The method of claim 32, wherein the memory device contains a current read register pointer which points to the current read register and a current write register pointer which points to the current write register; and wherein said step of performing read arbitration comprises comparing the values of the current read register pointer and the current write register pointer.

34. In a memory device containing a tri-port cache memory array of first capacity arranged as a plurality of registers of tri-port memory cells and a supplemental memory array of second capacity greater than the first capacity, a method of operating the memory device as a first-in first-out (FIFO) memory buffer, said method comprising the steps of:

reading data from a current read register in the cache memory array;

writing data to a current write register in the cache memory array while simultaneously transferring previously written data from a previous write register in the cache memory array to the supplemental memory array;

performing read arbitration to determine a next-to-read register as the current write register if the current write register contains next-to-read data relative to data in the current read register, or s a free register in the cache memory array if the current read and write registers are different registers and the next-to-read register is not the current write register; and transferring next-to-read data relative to the data in the current read register from the supplemental memory array to the next-to-read register so that the memory buffer emulates a dual-port FIFO having a capacity of at least the second capacity.

35. The method of claim 34, wherein the memory device contains a crosspoint switch electrically coupled between the cache memory array and the supplemental memory array; and wherein said step of transferring next-to-read data from the supplemental memory array to the next-to-read register comprises transferring a first portion of the next-to-read data in parallel from a first row of memory cells in the supplemental memory array through the crosspoint switch to the next-to-read register during a first portion of a read-from-memory time interval and then transferring a second portion of the next-to-read data in parallel from the first row of memory cells in the supplemental memory array through the crosspoint switch to the next-to-read register during a second portion of the read-from-memory time interval.

36. The method of claim 35, wherein said step of transferring previously written data comprises transferring a first portion of the previously written data in parallel from the previous write register through the crosspoint switch to a second row in the supplemental memory array during a first portion of a write-to-memory time interval and then transferring a second portion of the previously written data in parallel from the previous write register through the crosspoint switch to the second row in the supplemental memory array during a second portion of the write-to-memory time interval; wherein the first and second portions of the read-from-memory time interval are nonoverlapping; and wherein the first and second portions of the write-to-memory time interval are nonoverlapping.

* * * * *

UNITED STATES PATENT AND TRADEMARK OFFICE
CERTIFICATE OF CORRECTION

PATENT NO. : 6,216,205 B1  
DATED : April 10, 2001  
INVENTOR(S) : Chin et al.

Page 1 of 1

It is certified that error appears in the above-identified patent and that said Letters Patent is hereby corrected as shown below:

Column 24,  
Line 52, please change "next4o-write" to -- next-to-write --.

Column 25,  
Line 41, please change "mad" to -- read --.

Column 27,  
Line 30, please change "s" to -- as --.

Signed and Sealed this

Eighth Day of January, 2002

Attest:

*Attesting Officer*

JAMES E. ROGAN  
*Director of the United States Patent and Trademark Office*